United States Patent
Yamamoto et al.

(10) Patent No.: US 9,289,850 B2
(45) Date of Patent: Mar. 22, 2016

(54) LASER MACHINING DEVICE

(75) Inventors: Tatsuya Yamamoto, Tokyo (JP);
Junichi Nishimae, Tokyo (JP); Shuichi Fujikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 295 days.

(21) Appl. No.: 14/003,678

(22) PCT Filed: Mar. 13, 2012

(86) PCT No.: PCT/JP2012/056393
§ 371 (c)(1),
(2), (4) Date: Sep. 6, 2013

(87) PCT Pub. No.: WO2012/137579
PCT Pub. Date: Oct. 11, 2012

(65) Prior Publication Data
US 2013/0341309 A1 Dec. 26, 2013

(30) Foreign Application Priority Data

Apr. 8, 2011 (JP) ................................. 2011-086164
Sep. 20, 2011 (JP) ................................. 2011-204750

(51) Int. Cl.
*B23K 26/046* (2014.01)
*B23K 26/064* (2014.01)
(Continued)

(52) U.S. Cl.
CPC ............... *B23K 26/00* (2013.01); *B23K 26/046* (2013.01); *B23K 26/0643* (2013.01); *B23K 26/0665* (2013.01); *B23K 26/707* (2013.01)

(58) Field of Classification Search
CPC .......... B23K 26/0643; B23K 26/0665; B23K 26/428; B23K 26/0648; B23K 26/046; B23K 26/707
See application file for complete search history.

(56) References Cited

U.S. PATENT DOCUMENTS 6,353,203 B1 * 3/2002 Hokodate .......... B23K 26/0643
219/121.67
2011/0273787 A1 * 11/2011 Schuster ................ G02B 7/028
359/820

FOREIGN PATENT DOCUMENTS

DE 10007976 C1 * 9/2001
FR 2 698 495 A1 5/1994
(Continued)

OTHER PUBLICATIONS

Office Action issued May 18, 2015 in German Patent Application No. 11 2012 001 628.9 (with English language translation).

(Continued)

*Primary Examiner* — Geoffrey S Evans
(74) *Attorney, Agent, or Firm* — Oblon, McClelland, Maier & Neustadt, L.L.P.

(57) ABSTRACT

A laser machining apparatus, including: a laser light source; a transparent member that is set on an optical path of a laser beam and transmits the laser beam; a contact type temperature difference sensor, set on a surface of the transparent member outside an irradiation range of the laser beam, for detecting a temperature difference between a surface of the transparent member, which is spaced apart from a center of the transparent member by a first distance, and another surface of the transparent member, which is spaced apart from the center of the transparent member by a second distance larger than the first distance; and a controller correcting a focal position based on the temperature difference detected by the contact type temperature difference sensor to stabilize a beam diameter of the laser beam condensed onto a machining object.

16 Claims, 13 Drawing Sheets

(51) Int. Cl.
*B23K 26/70* (2014.01)
*B23K 26/00* (2014.01)
*B23K 26/04* (2014.01)
*B23K 26/06* (2014.01)

(56) References Cited

FOREIGN PATENT DOCUMENTS

| JP | 60-247489 A | * | 12/1985 |
| JP | 63 016889 | | 1/1988 |
| JP | 63-36990 A | * | 2/1988 |
| JP | 63-256289 A | * | 10/1988 |
| JP | 63-264289 A | | 11/1988 |
| JP | 01 122688 | | 5/1989 |
| JP | 02 075489 | | 3/1990 |
| JP | 04 167990 | | 6/1992 |
| JP | 2000 094173 | | 4/2000 |
| JP | 2010 247233 | | 4/2010 |

OTHER PUBLICATIONS

International Search Report Issued Jun. 19, 2012 in PCT/JP12/56393 Filed Mar. 13, 2012.

* cited by examiner

LASER MACHINING DEVICE

TECHNICAL FIELD

The present invention relates to a laser machining apparatus including a focal length automatic adjustment device.

BACKGROUND ART

A laser machining apparatus is configured to perform machining such as piercing or cutting by radiating a laser beam, which is condensed to have higher power density, to a machining object such as a metal material and a resin material. A lens for condensing the laser beam is called a machining lens, which absorbs a part of the laser beam transmitting therethrough and increases in temperature. The heat diffuses from a central part of the lens through which the laser beam transmits toward an outer peripheral part of the lens. Thus, there occurs a temperature distribution in which a temperature is higher at the central part of the machining lens and is relatively lower at the outer peripheral part thereof.

Meanwhile, a refractive index of a material for the machining lens has temperature dependence. Thus, when the machining lens has the temperature distribution, the temperature distribution causes a distribution of the refractive index. As a result, what is called a thermal lens effect is generated.

The refractive index distribution varies along with time of the transmission of the laser beam, and is converged to a steady state value with a predetermined time constant. In other words, a magnitude of the thermal lens effect tends to vary along with the elapse of a machining time, and then tends to be saturated to a predetermined magnitude.

When the laser beam is condensed with the machining lens and radiated to the machining object, the thermal lens effect causes a variation in focal length of the machining lens and a variation in beam diameter of the laser beam radiated to the machining object. Further, the magnitude of the thermal lens effect varies along with the elapse of the machining time, and the beam diameter varies as well along with the machining time. As a result, machining becomes unstable, which may cause machining defects.

In view of the circumstance, in order to prevent the variation of the beam diameter on the machining object, which is caused by the thermal lens effect, and the temporal variation of the beam diameter during the machining step, there has been proposed a laser machining apparatus having a focal position automatic correction function of detecting, with a far-infrared radiation thermometer and a thermocouple, temperatures of a laser irradiation part on the machining lens and a peripheral part of the machining lens, and correcting a clearance between the machining lens and the machining object based on the temperatures thus detected so as to offset the thermal lens effect, to thereby stabilize the beam diameter of the laser beam on the machining object (refer, for example, to Patent Literature 1).

In the following, description is made of a conventional laser machining apparatus including a focal length automatic adjustment device with reference to FIG. 10. FIG. 10 is a view of a structure of the conventional laser machining apparatus described in Patent Literature 1.

In FIG. 10, a temperature of a central part of a machining lens 31 at the time of entry of a laser beam 32 is measured with a far-infrared radiation thermometer 34 set at a position distanced from the machining lens 31, and a temperature of a side surface of the machining lens 31 is measured with a thermocouple 33. Measurement results of those temperatures are input to a microcomputer 36, and a required lens moving amount is calculated. In this way, a position of the machining lens 31 is adjusted with a Z-axis stage 38 in directions of an optical axis of the laser beam 32.

The machining lens 31 absorbs a part of the laser beam 32 at the time of transmission of the laser beam 32 therethrough, and heat absorbed simultaneously therewith flows toward an outer periphery of the machining lens 31. As a result, the temperature of the central part of the machining lens 31 increases, and the temperature of the outer peripheral portion decreases in contrast. In other words, a radial temperature distribution occurs in the machining lens 31, and a phenomenon called a thermal lens is generated at this time.

A refractive index of a material for the machining lens 31 has temperature dependence, and hence when the temperature distribution occurs, a refractive index distribution occurs as well. In other words, the thermal lens refers to a lens effect caused by the refractive index distribution. However, it is necessary to notice that the temperature itself of the machining lens 31 does not cause the thermal lens. The thermal lens of the machining lens 31 is normally a convex lens component. When the thermal lens occurs, a focal length of the machining lens 31 varies, with the result that a diameter of the beam radiated to the machining object varies.

Further, after the start of irradiation of the laser beam 32 to the machining lens 31 at the start of machining, the temperature distribution of the machining lens 31 approaches a steady state value with a certain time constant. Thus, the magnitude of the thermal lens varies during the machining. In other words, the diameter of the beam radiated to the machining object varies during the machining. As a result, the machining may become unstable, or machining defects may occur.

In order to prevent this, it may be appropriate to change the position of the machining lens 31 in accordance with the magnitude of the thermal lens so as to correct the variation of the focal length. Note that, as describe above, the magnitude of the thermal lens varies during the machining, and hence the magnitude of the thermal lens needs to be detected in real time during the machining.

The thermal lens is influenced by the temperature distribution, and hence the magnitude of the thermal lens can be grasped through measurement of the temperature distribution. In Patent Literature 1, the thermal lens is calculated through measurement of the temperatures of the laser beam irradiation portion on the machining lens 31 and the peripheral portion of the machining lens 31 with the thermocouple 33 and the far-infrared radiation thermometer 34.

CITATION LIST

Patent Literature

[PTL 1] JP 1-122688 A (page 4, lines 7 to 18)

SUMMARY OF INVENTION

Technical Problems

However, the conventional laser machining apparatus including such a focal length automatic adjustment device needs to use, temperature sensors of two types, in other words, the thermocouple and the radiation thermometer. In particular, the radiation thermometer is relatively expensive. Further, when a $CO_2$ laser with a wavelength of approximately 10 μm is used as a laser light source in the laser machining apparatus, there are problems in that failures of the far-infrared radiation thermometer may be caused by influences of, for example, scattered light of the $CO_2$ laser from the machining object and a radiation beam influenced by a temperature of the machining object, and in that stable machining cannot be performed.

Further, in the laser machining apparatus, at the time of machining, the clearance between the machining lens and the machining object needs to be changed depending on a machining material and in accordance with a machining condition. Thus, depending on a mounting position of the radiation thermometer, the clearance between the radiation thermometer and the machining lens varies and measurement points vary as well. As a result, the temperatures may not be accurately measured. In order to fix the clearance between the radiation thermometer and the machining lens, the machining lens and the radiation thermometer need to be moved simultaneously with each other, which may cause another problem of an increase in size of the apparatus.

The present invention has been made to solve the problems described above, and it is an object thereof to provide a laser machining apparatus which is capable of simplifying a structure of a focal length automatic adjustment device, and by extension, inexpensively has a focal position automatic correction function free from failures, and is capable of performing stable machining.

Solution to Problems

According to the present invention, there is provided a laser machining apparatus includes a machining lens for condensing a laser beam to a machining object; focal length adjusting means for adjusting a focal length of the machining lens; a contact type temperature sensor including a first temperature measurement point and a second temperature measurement point that are set on a surface of the machining lens outside an irradiation range of the laser beam and in a radial direction from a center of the machining lens on an incident side of the laser beam, the first temperature measurement point and the second temperature measurement point being spaced apart from the center of the machining lens by different distances, the contact type temperature sensor being configured to detect a temperature difference between the first temperature measurement point and the second temperature measurement point; and a control device for calculating a thermal lens magnitude of the machining lens based on a potential difference corresponding to the temperature difference detected by the contact type temperature sensor, calculating a focal length correction amount in accordance with the calculated thermal lens magnitude so as to stabilize a beam diameter of the laser beam condensed onto the machining object, and outputting a control signal to the focal length adjusting means.

Advantageous Effects of Invention

According to the laser machining apparatus of the present invention, the temperature difference between the two points on a transparent member set on an optical path of the laser beam is detected by the contact type temperature sensor, and a focal position is corrected based on results of the detection of the temperature difference. The expensive far-infrared radiation thermometer is not used, and hence cost can be saved. Further, the failures caused by the influences of, for example, the scattered light of the laser, the reflected light from the machining object, and the radiation beam influenced by the temperature of the machining object are not involved. In addition, relative positions of the temperature measurement points, and the lens do not vary, and hence an accurate temperature can be measured constantly under a certain condition irrespective of the position of the lens. Based on the temperature thus detected, the focal point is automatically adjusted in accordance with the magnitude of the thermal lens. As a result, stable machining can be performed at low cost and with a simple configuration.

DESCRIPTION OF EMBODIMENTS

Figure 1:
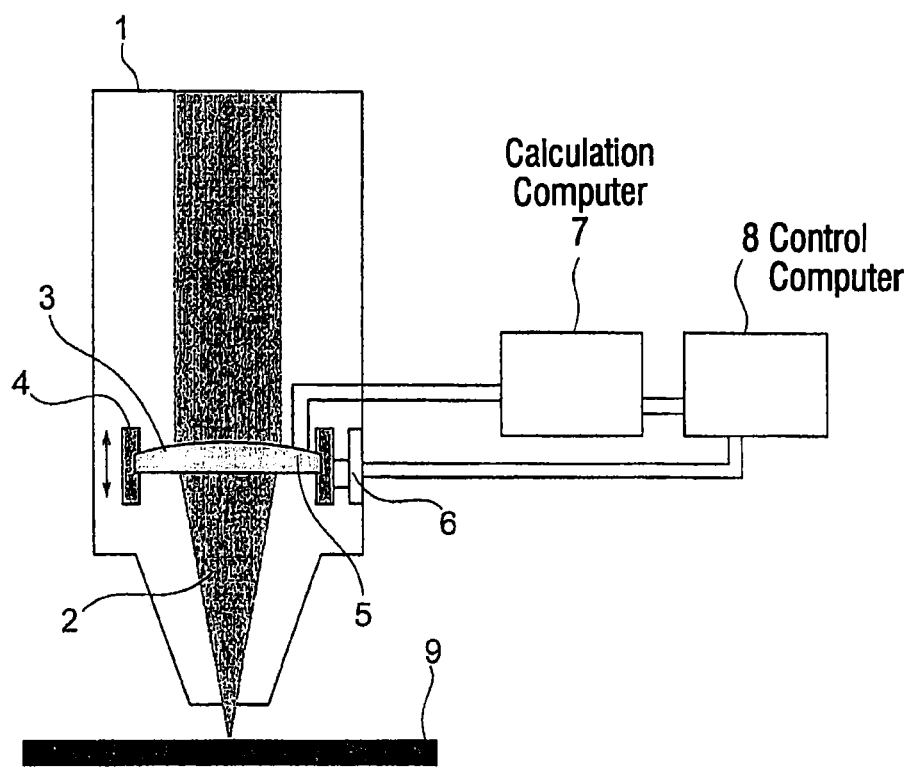
FIG. 1 is a partial sectional view of a structure of a laser machining apparatus according to a first embodiment of the present invention.

First Embodiment.

In the following, description is made of a laser machining apparatus according to preferred embodiments of the present invention with reference to the drawings.

Note that, both in the description of the embodiments and in the drawings, the same reference symbols denote the same or equivalent parts.

First, with reference to FIGS. 1 to 7, description is made of a laser machining apparatus according to a first embodiment of the present invention.

FIG. 1 is a partial sectional view of a structure of the laser machining apparatus according to the first embodiment of the present invention. FIG. 1 illustrates a vicinity of a machining head of the laser machining apparatus, specifically, a cross-section at a center of a machining lens, but does not illustrate other components of the laser machining apparatus, such as a laser oscillator for generating a laser beam, and an optical path system for guiding the laser beam to the machining head.

In FIG. 1, the laser machining apparatus according to the first embodiment of the present invention includes a machining head 1 having an outer shape such as a circular columnar shape and a polygonal columnar shape, a machining lens 3 which is a circular convex lens for condensing a laser beam 2 to a machining object 9, a lens holder 4 for holding the machining lens 3, the lens holder 4 having an outer shape such as a circular cylindrical shape and a polygonal cylindrical shape, a temperature sensor 5, a lens drive device 6 for moving the lens holder 4 in directions of an optical axis of the laser beam 2, a calculation computer 7 for calculating a thermal lens magnitude of the machining lens 3 based on a potential difference corresponding to a temperature difference detected by the temperature sensor 5, and a control computer 8 for calculating a lens position correction amount in accordance with the thermal lens magnitude and outputting a control signal to the lens drive device 6. Note that, the calculation computer 7 and the control computer 8 may be integrated into a single computer (control apparatus) having functions of those computers.

Figure 2:
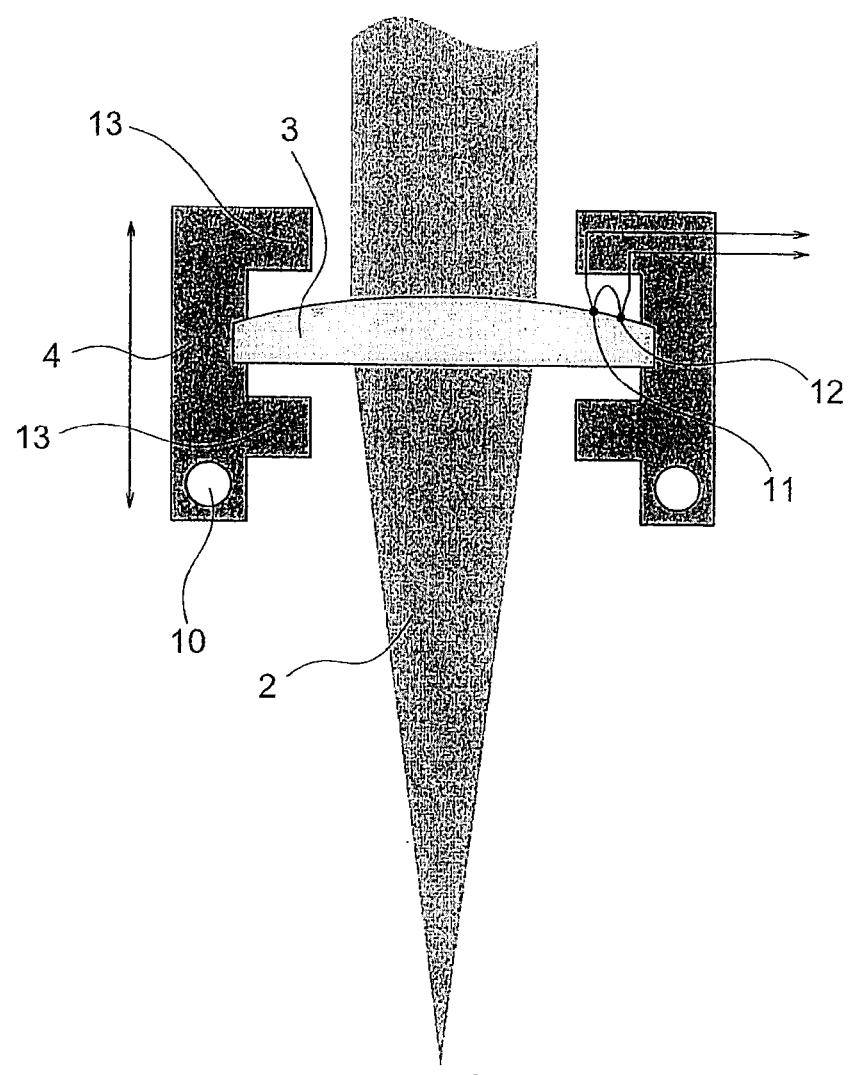
FIG. 2 is an enlarged sectional view of a structure around a machining lens of the laser machining apparatus according to the first embodiment of the present invention.

FIG. 2 is an enlarged view of a structure around the machining lens of the laser machining apparatus according to the first embodiment of the present invention.

In FIG. 2, the lens holder 4 includes a coolant channel 10 having a shape of a doughnut or the like and provided to surround an entire periphery of the laser beam 2, and shields 13 having a shape of a doughnut or the like and facing end portions on both sides of the machining lens 3 (incident side and exit side of the laser beam 2) and to surround the entire periphery of the laser beam 2. Further, on an upper surface of the machining lens 3, there are provided a hot junction 11 of a thermocouple as the temperature sensor 5 and a cold junction 12 of the thermocouple. Note that, the hot junction 11 and the cold junction 12 of the thermocouple may be provided on a lower surface of the machining lens 3.

Figure 3:
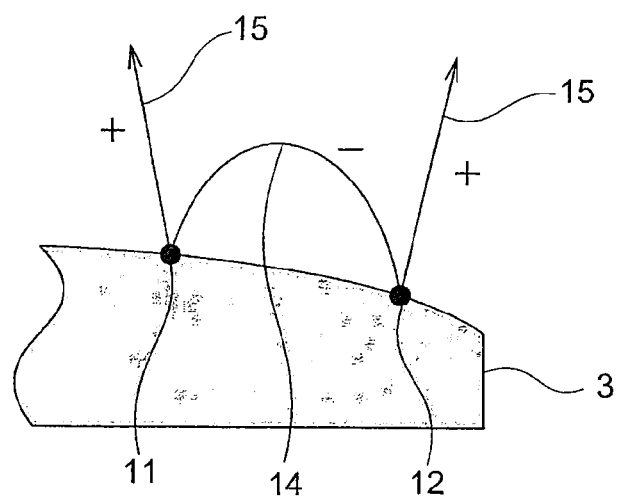
FIG. 3 is a view illustrating a wire connecting method for a thermocouple as a temperature sensor of the laser machining apparatus according to the first embodiment of the present invention.

FIG. 3 is a view illustrating a wire connecting method for the thermocouple as the temperature sensor of the laser machining apparatus according to the first embodiment of the present invention.

As illustrated in FIG. 3, a negative thermocouple wire 14 is connected between the hot junction 11 and the cold junction 12 of the thermocouple, and a positive thermocouple wire 15 is connected to each of the hot junction 11 and the cold junction 12.

Figure 4A:
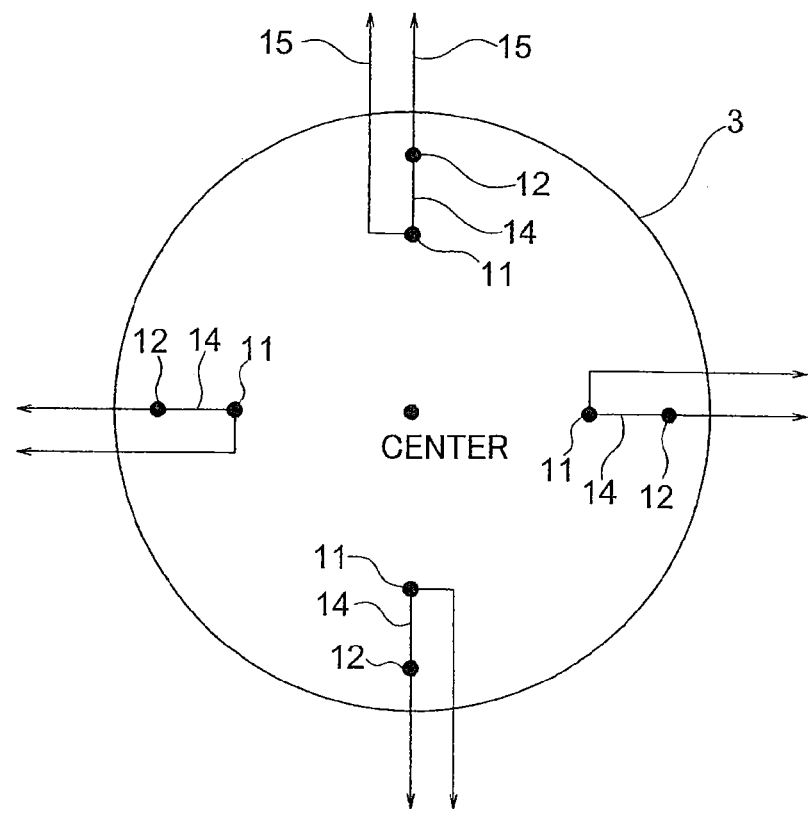
FIG. 4 are views each illustrating a wire connecting method for a plurality of thermocouples of the laser machining apparatus according to the first embodiment of the present invention.
Figure 4B:
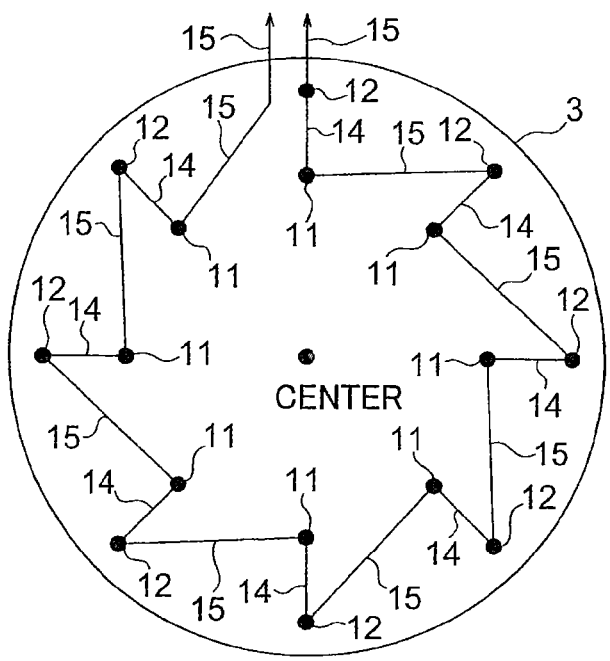
Figure 5:
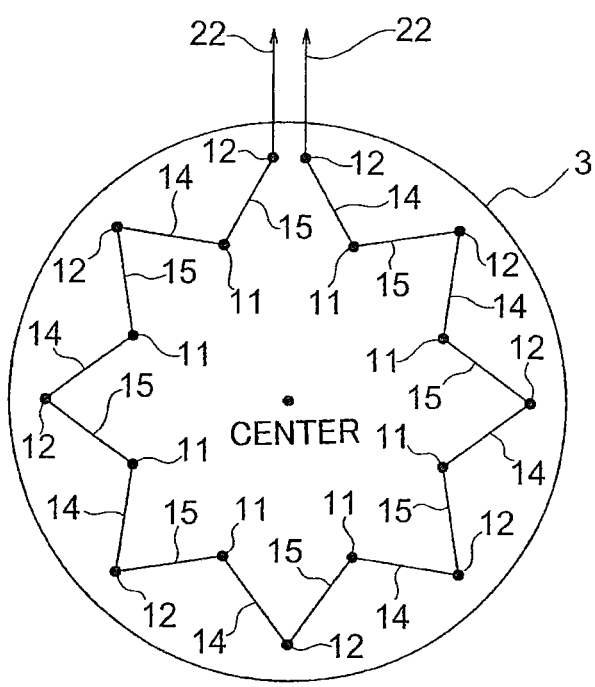
FIG. 5 is a view illustrating another wire connecting method for the plurality of thermocouples of the laser machining apparatus according to the first embodiment of the present invention.

FIGS. 4 and 5 are views each illustrating a wire connecting method for a plurality of thermocouples of the laser machining apparatus according to the first embodiment of the present invention.

FIG. 4 are each a plan (front) view of the machining lens 3 as viewed in an axial direction in which the laser beam 2 enters. FIG. 4(a) illustrates a case where a plurality of (four) thermocouples are connected in parallel, and FIG. 4(b) illustrates a case where a plurality of (eight) thermocouples are connected in series. In the case of the parallel connection, potential differences (temperature differences) detected by the thermocouples are averaged, and hence a variation in heat conduction can be suppressed. As a result, accuracy can be enhanced. Meanwhile, in the case of the series connection, detection accuracy can be enhanced in proportion to the number of the thermocouples, and hence the series connection is advantageous when a potential difference (temperature difference) detected by one of the thermocouples is especially small. FIG. 5 also illustrates a case where a plurality of thermocouples are connected in series. FIG. 4 each illustrate an example in which the hot junction 11 and the cold junction 12 of each of the thermocouples are aligned along a radial direction from a center of the machining lens 3. However, as illustrated in FIG. 5, the hot junction 11 and the cold junction 12 need not be aligned, and it is also effective to provide another cold junction 12 and to use normal signal lines 22 as wiring extending from the machining lens 3 to an outside thereof.

Next, description is made of operation of the laser machining apparatus according to the first embodiment of the present invention with reference to the drawings.

Figure 6:
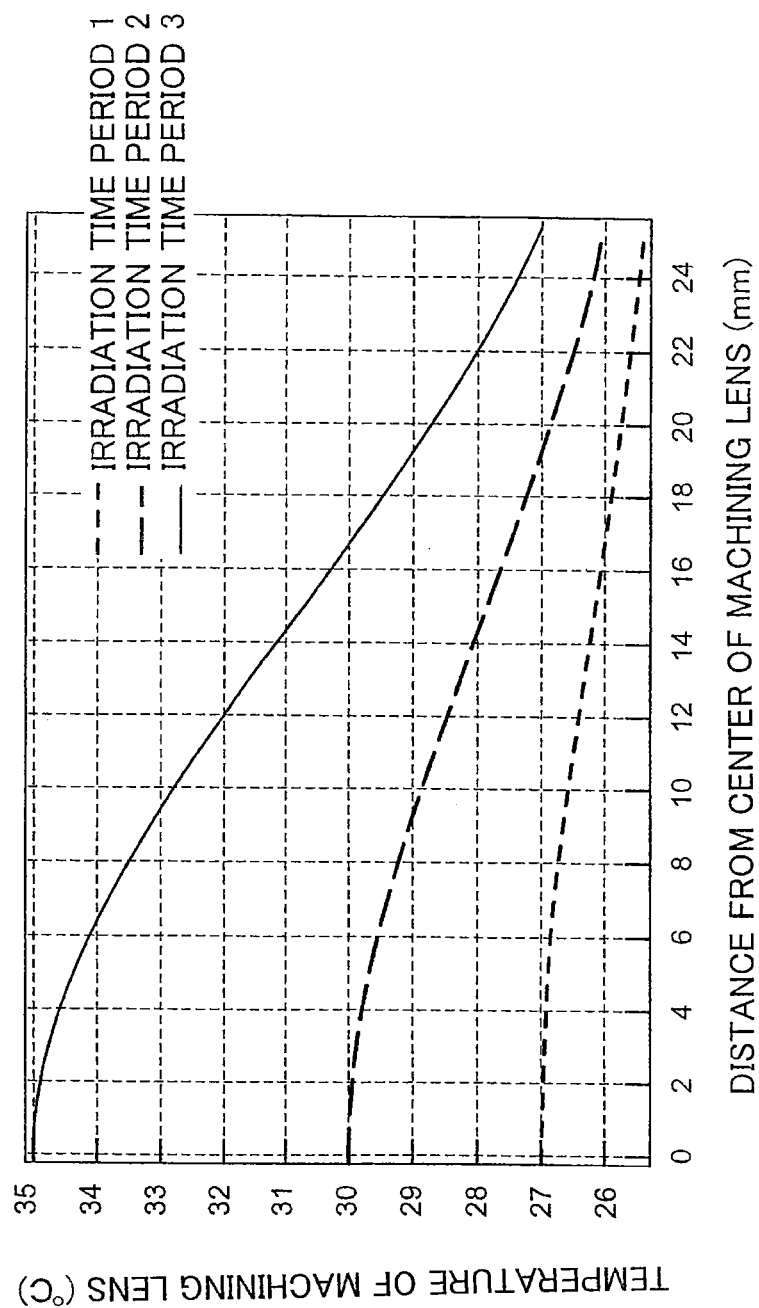
FIG. 6 is a graph showing radial temperature distributions of the machining lens of the laser machining apparatus according to the first embodiment of the present invention.

FIG. 6 is a graph showing radial temperature distributions of the machining lens of the laser machining apparatus according to the first embodiment of the present invention. In FIG. 6, an irradiation time period of the laser beam 2 with respect to the machining lens 3 is used as a parameter, and the irradiation time period increases in the order of irradiation time periods 1, 2, and 3 shown in FIG. 6.

Figure 7:
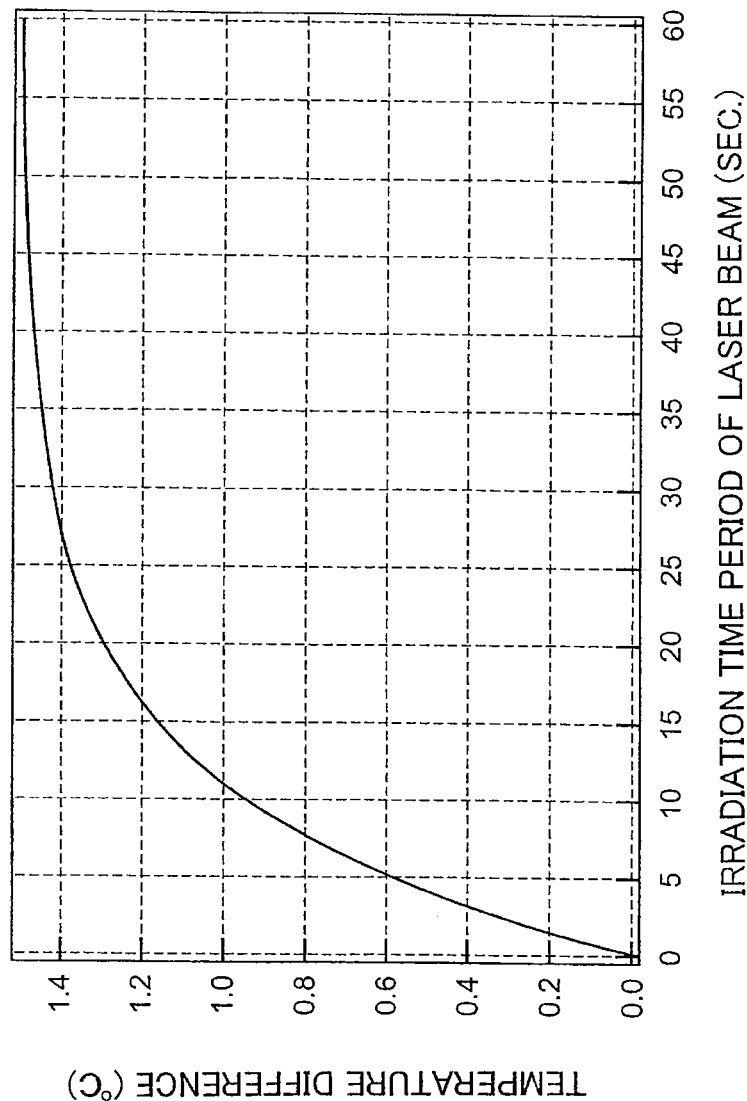
FIG. 7 is a graph showing a temporal change of a temperature difference between a hot junction and a cold junction of the thermocouple at the time of irradiation of a laser beam to the machining lens of the laser machining apparatus according to the first embodiment of the present invention.

FIG. 7 is a graph showing a temporal change of the temperature difference between the hot junction and the cold junction of the thermocouple at the time of irradiation of the laser beam to the machining lens of the laser machining apparatus according to the first embodiment of the present invention.

In FIG. 1, the laser beam 2 is guided from the laser oscillator (not shown) to the machining head 1 via the optical system. After entering the machining head 1, the laser beam 2 enters the machining lens 3 in the machining head 1, and is then condensed and radiated to the machining object 9.

Examples of the machining object 9 include metals such as a mild steel and a stainless steel. In cutting on those metals, the machining head 1 is moved parallel to a surface of the metal (normally in horizontal direction), or the metal of the machining object 9 is moved. In this way, the cutting is performed. Examples of the laser used in this case include a $CO_2$ laser, a YAG laser, a fiber laser, and a semiconductor laser.

The machining lens 3 absorbs a part of the laser beam 2 at the time of transmission of the laser beam 2 therethrough, and heat absorbed simultaneously therewith flows toward the lens holder 4 on an outer periphery of the machining lens 3. As a result, the temperature distributions as shown in FIG. 6 are generated in the radial direction of the machining lens 3, and a phenomenon called "thermal lens" mentioned above occurs. Further, the temperature distribution depends on the irradiation time periods of the laser beam 2 with respect to the machining lens 3. As the irradiation time periods become longer, the temperature differences in the radial direction of the machining lens 3 become larger. Finally, certain temperature distribution profiles are obtained.

The temperature distribution is generated in the radial direction of the machining lens 3, and hence the temperature difference as shown in FIG. 7 is generated between the hot junction 11 and the cold junction 12 of the thermocouple in accordance with the irradiation time period of the laser beam 2. In this way, the potential difference occurs in the thermocouple. Based on the potential difference, the calculation computer 7 calculates the thermal lens magnitude. In accordance with the thermal lens magnitude obtained by the calculation computer 7, the control computer 8 calculates a lens position correction amount required for maintaining a stable beam diameter of the laser beam 2 with respect to the machining object 9, and sends a control signal to the lens drive device 6.

Here, description is made of how the calculation computer 7 calculates the thermal lens magnitude based on the potential difference. As referred to in Known Document 1 (specifically, "The Physics and Technology of Laser Resonators" D. R. Hall, P. E. Jackson, ISBN: 0-85274-117-0, p. 181), the thermal lens magnitude is represented by the following equation (1).

[Math. 1]

$$f = \frac{2\kappa}{AI_0\left(\frac{dn}{dT}\right)} \quad (1)$$

In the equation (1), "f" represents a focal length of the thermal lens, "κ" represents a heat conductivity (physical property), "$AI_0$" represents an amount of heat to be absorbed into the machining lens 3 per unit time and per unit area, "A" represents an absorption coefficient, "$I_0$" represents a beam intensity, "dn/dT" represents refractive index temperature dependence (physical property), and "T" represents a temperature. Actually, the thermal lens magnitude is equal to a value obtained by multiplying the equation (1) by a coefficient corresponding to a beam profile. Meanwhile, as represented by the following equation (2) where "λ" represents a heat conductivity (physical property), when heat flows only in the radial direction, Fourier's law in a one-dimensional cylindrical coordinate system is applied.

[Math. 2]

$$q = -\lambda \cdot 2\pi r \frac{\partial T}{\partial r} \quad (2)$$

In other words, when a temperature gradient in the radial direction of the machining lens 3 is obtained, an amount of heat input to the machining lens 3 is obtained as well. Further, the temporal change of the temperature is obtained by a well-known heat conduction equation. For example, FIG. 6 shows time dependence of the radial temperature distributions of the machining lens 3. In other words, when the temperature difference between two points and the temporal change thereof are obtained, the amount of heat input to the machining lens 3 and a temporal change thereof are obtained in principle. The amount of input heat is obtained by multiplying an output of the laser beam that enters the machining lens 3 by an absorption rate of the machining lens 3. Thus, the thermal lens magnitude is obtained from the equation (1). In the calculation computer 7, the time dependence of the temperature distributions shown in FIG. 6 may be calculated in real time, or the amount of input heat, in other words, the thermal lens magnitude may be obtained through comparison between values calculated in advance or values measured in advance and stored in a database and the temperature difference measured in real time.

Next, description is made of how the control computer 8 calculates the lens position correction amount required in accordance with the thermal lens magnitude. From a focal length "$f_0$" of the machining lens 3 and the focal length "f" of the thermal lens in the equation (1), the lens position correction amount "dz" is represented by the following equation (3).

[Math. 3]

$$dz = f_0 - \frac{1}{\left(\frac{1}{f_0} + \frac{1}{f}\right)} \quad (3)$$

When the focal length "f" of the thermal lens is sufficiently larger than the focal length "$f_0$" of the machining lens 3, the following approximation can be established.

[Math. 4]

$$dz = \frac{f_0^2}{f}$$

Next, description is made of how the lens position correction amount calculated by the control computer 8 is converted to the control signal to be sent to the lens drive device 6, and how the lens drive device 6 drives the lens holder 4 in response to the control signal. As referred to in Known Document 2 (specifically, FIG. 3 of International Patent Application No. "WO2009/122758A1"), the lens drive device 6 may drive the lens holder 4 by using a stepper motor and a ball screw.

In Known Document 2 (FIG. 3) mentioned above, the ball screw is rotated along with rotation of the stepper motor so that fixing plates are vertically moved along guide rods.

In this way, a machining lens 7 is vertically moved in a machining head 10. In the first embodiment, a required rotational amount of the stepper motor is calculated based on the lens position correction amount calculated by the control computer 8, and a control signal for rotating the stepper motor by the required amount is sent to the lens drive device 6. In this way, the position of the machining lens 3 can be corrected in accordance with the thermal lens magnitude.

As shown in FIG. 7, the temperature difference between the hot junction 11 and the cold junction 12 of the thermocouple temporally varies, and hence the thermal lens magnitude temporally varies as well. Thus, when those factors are controlled in real time during machining, the laser beam 2 is radiated to the machining object 9 while being maintained to have a stable beam diameter. As a result, stable machining can be performed.

In this case, it is important to mount the hot junction 11 and the cold junction 12 of the thermocouple to positions within the same individual, the positions being made of the same material and free from a contact surface or the like therebetween. With this, Fourier's law in a heat conduction theory can be used as it is for calculating the amount of heat input to the machining lens 3 based on the temperature difference between the two points. The heat conductivity in the equation of Fourier's law is a physical property, and hence is accurately represented by a value.

Meanwhile, when the hot junction 11 and the cold junction 12 are mounted to positions each made of a different material and a contact surface is interposed therebetween, heat resistance at a contact needs to be calculated in order to grasp the amount of heat. However, the heat resistance is not a physical property, and largely varies depending on a condition of the contact surface, and hence it is difficult to accurately obtain the amount of heat. Further, the heat flows toward the radial direction of the machining lens 3, and hence the positions of the hot junction 11 and the cold junction 12 are desirably aligned along the radial direction from the center of the machining lens 3.

As illustrated in FIG. 3, in order to directly convert the temperature difference to the potential difference, a series connection is employed as the wire connecting method for the thermocouple for calculating the temperature difference. The polarities of the thermocouple wires 14 and 15 illustrated in FIG. 3 may be reverse to each other. Further, the temperature difference may be calculated as follows: independently measuring temperatures of the hot junction 11 and the cold junction 12 as in a case of measuring a temperature with a normal thermocouple; and calculating a difference therebetween with the calculation computer 7. In this case, the temperature sensor 5 may be a platinum resistance temperature detector or a thermistor other than the thermocouple.

The hot junction 11 and the cold junction 12 as temperature measurement points are set to positions outside an irradiation range of the laser beam 2. In addition, as illustrated in FIG. 2, the shields 13 are provided to prevent scattered light of the laser beam 2 and reflected light from the machining object 9 from entering the temperature measurement points.

A beam diameter of, for example, a $CO_2$ laser, which enters the machining lens 3, normally ranges approximately from $\Phi$20 mm to $\Phi$30 mm. Thus, the hot junction 11 of the thermocouple needs to be mounted to a position separated from the center of the lens by a radius of 10 mm or more. The cold junction 12 of the thermocouple needs to be mounted on an outer side with respect to the hot junction 11, and hence a diameter of the machining lens 3 needs to fall within a range of at least from approximately $\Phi$2 inches to $\Phi$2.5 inches. When the amount of heat absorbed into the machining lens 3 by the entry of the laser beam 2 into the machining lens 3 flows to other parts before passing by the hot junction 11 and the cold junction 12, the amount of heat cannot be accurately measured based on the temperature difference. As a countermeasure, nothing other than the hot junction 11 of the thermocouple is held in contact with the machining lens 3 between the center of the machining lens and the cold junction 12 of the thermocouple. Further, the shield 13 is preferred to be spaced 1 mm or more apart from the machining lens 3. Note that, components other than the hot junction 11 may be held in contact with the machining lens 3 as long as a heat insulating member or the like is provided to prevent the heat from flowing to other components.

For example, ZnSe used as the machining lens 3 in the $CO_2$ laser has a heat conductivity of 18 W/(m·K). When an area of a contact surface of the machining lens 3 with respect to the lens holder 4, which is located on an outer side with respect to the cold junction 12 of the thermocouple, and an area of a contact part between the machining lens 3 and the heat insulating member are set to be substantially equal to each other so that the amount of heat to flow to the heat insulating member is reduced to 1/20, it is only necessary to prepare a heat insulating member having a heat conductivity of equal to or less than 0.9 W/(m·K) that is 1/20 of the heat conductivity of ZnSe. In this case, the thermal lens magnitude obtained by measurement of the thermocouple and calculation of by the calculation computer 7 involves errors of approximately 5%. However, machining can be sufficiently stably performed even with the errors of approximately 5%.

One or a plurality of thermocouples are provided on the machining lens 3, and the thermal lens magnitude is calculated based on the temperature difference between two points. During machining, a position of the machining lens is controlled for correcting this. In this way, machining can be stably performed irrespective of the thermal lens magnitude.

In the first embodiment, unlike Patent Literature 1 mentioned above, the relative positions of the temperature measurement points and the machining lens 3 do not vary, and hence an accurate temperature can be measured constantly under a certain condition irrespective of the position of the machining lens 3. As a result, a focal length automatic adjustment device having a simple configuration is obtained at low cost.

Second Embodiment.

Figure 8:
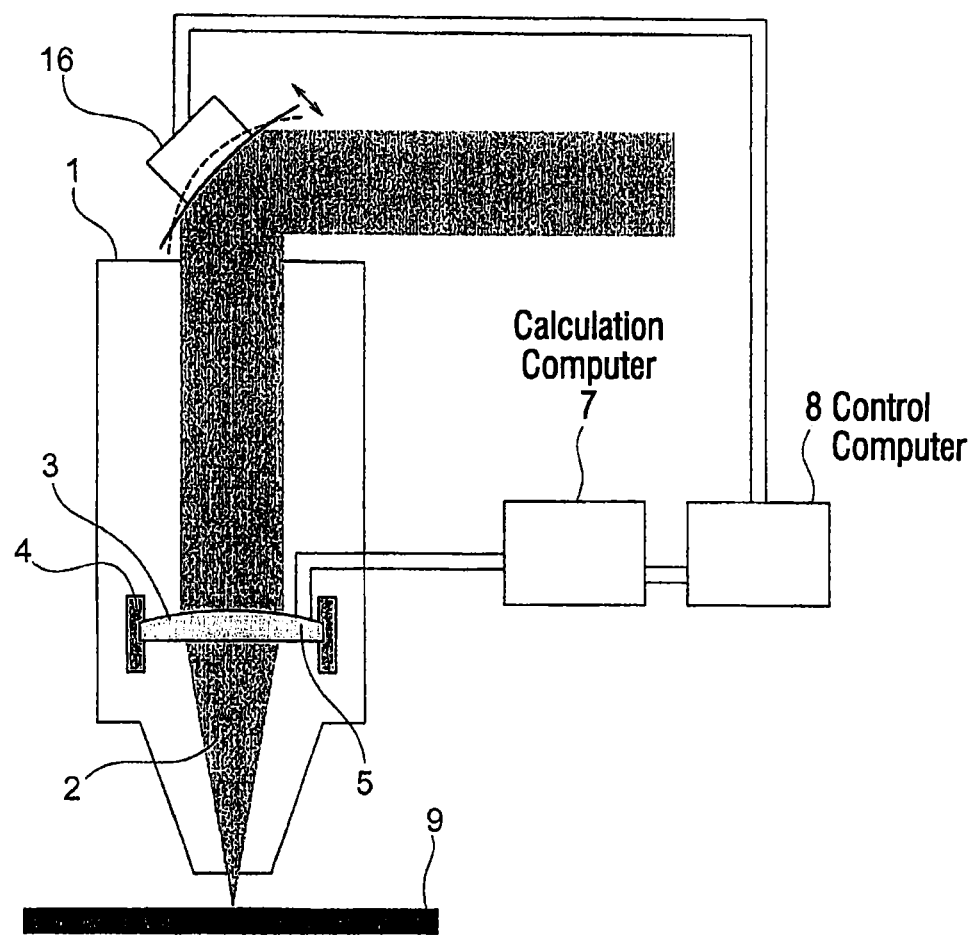
FIG. 8 is a partial sectional view of a structure of a laser machining apparatus according to a second embodiment of the present invention.

Description is made of a laser machining apparatus according to a second embodiment of the present invention with reference to FIG. 8. FIG. 8 is a partial sectional view of a structure of the laser machining apparatus according to the second embodiment of the present invention. FIG. 8 illustrates a machining head portion of the laser machining apparatus, and does not illustrate some of the components of the laser machining apparatus, such as the laser oscillator for generating a laser beam, and the optical path system for guiding the laser beam to the machining head.

In FIG. 8, the laser machining apparatus according to the second embodiment of the present invention is provided with, instead of the lens drive device 6, a curvature variable mirror and a mirror drive device 16 for changing the curvature. Note that, a broken line indicates the mirror with a changed curvature.

Next, description is made of operation of the laser machining apparatus according to the second embodiment with reference to the drawings.

As in the first embodiment described above, in FIG. 8, the laser beam 2 is emitted from the laser oscillator (not shown) and enters the curvature variable mirror 16 via the optical system, and then guided to the machining head 1. After entering the machining head 1, the laser beam 2 enters the machining lens 3 in the machining head 1, and is then condensed and radiated to the machining object 9.

Examples of the machining object 9 include metals such as a mild steel and a stainless steel. Examples of the laser used in this case include a $CO_2$ laser, a YAG laser, a fiber laser, and a semiconductor laser.

The machining lens 3 absorbs a part of the laser beam 2 during transmission of the laser beam 2 therethrough, and heat absorbed simultaneously therewith flows toward the lens holder 4 on the outer periphery of the machining lens. As a result, the thermal lens occurs.

As in the first embodiment described above, the temperature sensor 5 is configured as illustrated in FIG. 3. A temperature difference is generated between the hot junction 11 and the cold junction 12 of the thermocouple, and the calculation computer 7 calculates a thermal lens magnitude based on a potential difference of the thermocouple at this time. In accordance with the thermal lens magnitude obtained by the calculation computer 7, the control computer 8 calculates a curvature variation amount required for maintaining a stable beam diameter of the laser beam 2 with respect to the machining object 9, and sends a control signal to the mirror drive device for the curvature variable mirror 16.

Next, description is made of how the control computer 8 calculates the curvature variation amount required in accordance with the thermal lens magnitude. When "dD" represents the curvature variation amount, "f" represents a focal length of the laser beam from the machining lens 3 to the machining object 9, "$f_0$" represents the focal length of the machining lens 3, and "f'" represents the focal length of the thermal lens, a relationship represented by the following equation (4) is established.

[Math. 5]

$$\frac{1}{f'} = \frac{1}{f_0} + \frac{1}{f} + dDdz = \frac{f_0^2}{f} \quad (4)$$

The focal length from the machining lens 3 to the machining object 9 needs to be prevented from varying even when the thermal lens occurs, and hence a relationship represented by the following equation (5) needs to be established.

[Math. 6]

$$\frac{1}{f'} = \frac{1}{f_0} \quad (5)$$

In other words, the curvature variation amount is represented by the following equation (6).

[Math. 7]

$$dD = -\frac{1}{f} \quad (6)$$

Next, description is made of how the curvature variation amount calculated by the control computer 8 is converted to the control signal to be sent to the mirror drive device 16, and how the mirror drive device 16 drives the curvature variable mirror 16 in response to the control signal. As referred to in Known Document 3 (specifically, FIG. 2 of International Patent Application No. "JP 3138613 B"), the mirror drive device 16 may deform the mirror by using air pressure.

In Known Document 3 (FIG. 2) mentioned above, a control device feeds air into an air jacket arranged on a rear surface of a curvature variable mirror so as to apply pressure. In this way, a curvature of the mirror is changed. The pressure of the air is adjusted by solenoid valves, and the control device controls the solenoid valves.

In the second embodiment, the mirror drive device 16 may have the same structure as one described above. In the second embodiment, the control computer 8 calculates a required curvature variation amount and sends a control signal to the mirror drive device 16 so as to achieve a desired curvature variation.

As in Known Document 3, the mirror drive device 16 feeds air to a rear surface of the mirror so as to apply pressure. In this way, a curvature of the mirror is changed.

The curvature variable mirror 16 has a function to vary a wavefront curvature of the laser beam 2 at the time of entry into the machining lens 3 so as to correct a focus variation caused by the thermal lens.

When those processes are performed in real time during machining, the laser beam 2 is radiated to the machining object 9 while being maintained to have a stable beam diameter. As a result, stable machining can be performed.

One or a plurality of thermocouples are provided on the machining lens 3, and the thermal lens magnitude is calculated based on the temperature difference between two points. During machining, a curvature of the curvature variable mirror is controlled for correcting this. In this way, machining can be stably performed irrespective of the thermal lens magnitude.

In the second embodiment, unlike Patent Literature 1 mentioned above, the relative positions of the temperature measurement points and the machining lens 3 do not vary, and hence an accurate temperature can be measured constantly under a certain condition irrespective of the position of the machining lens 3. As a result, a focal length automatic adjustment device having a simple configuration is obtained at low cost.

Third Embodiment.

Figure 9:
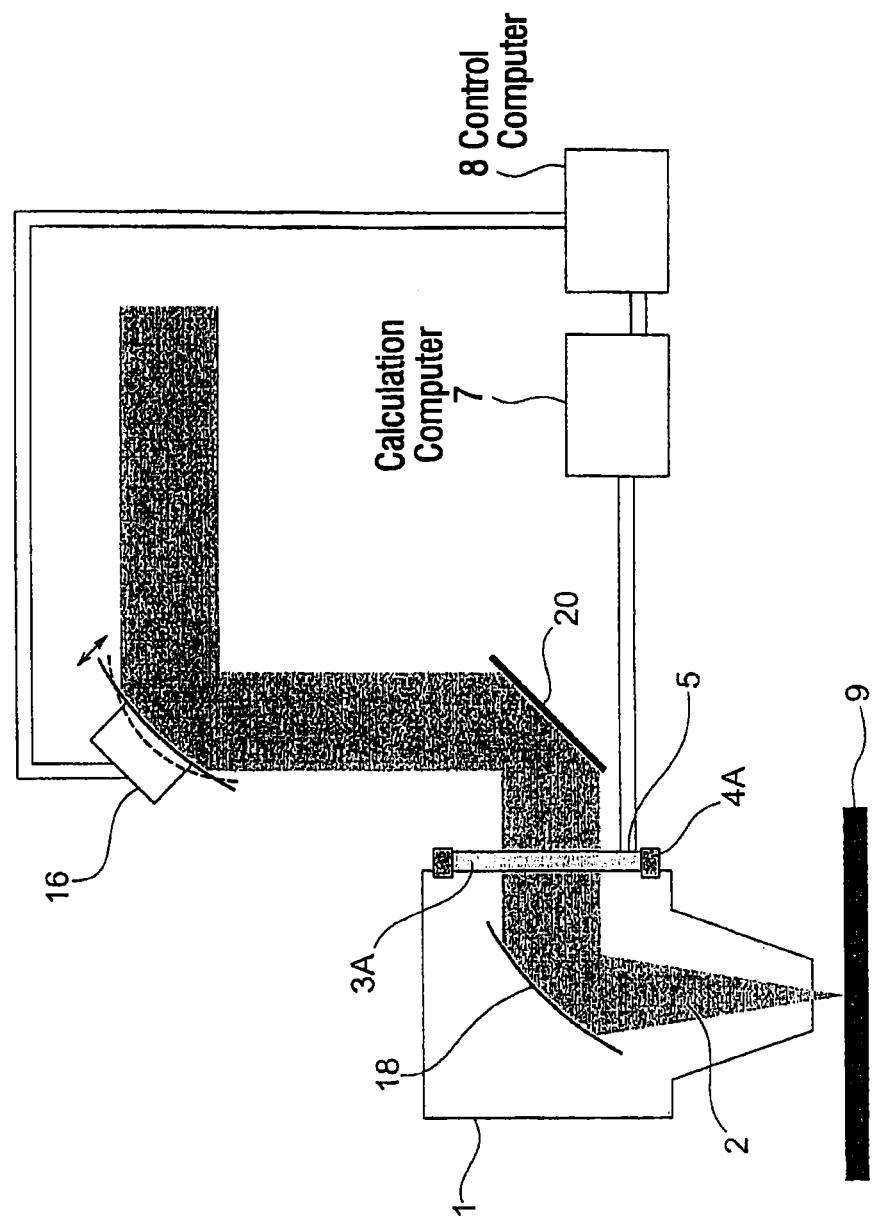
FIG. 9 is a partial sectional view of a structure of a laser machining apparatus according to a third embodiment of the present invention.
Figure 10:
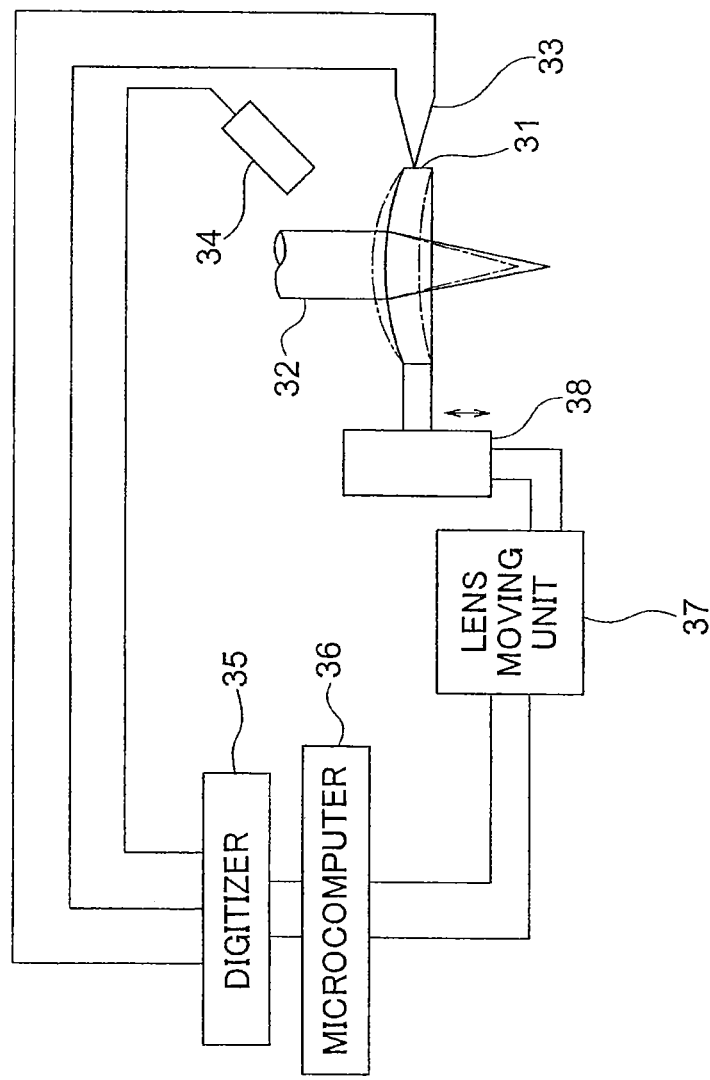
FIG. 10 is a view of a structure of a conventional laser machining apparatus.

Description is made of a laser machining apparatus according to a third embodiment of the present invention with reference to FIG. 9. FIG. 9 is a partial sectional view of a structure of the laser machining apparatus according to the third embodiment of the present invention. FIG. 9 illustrates a vicinity of the machining head of the laser machining apparatus, and does not illustrate some of the components of the laser machining apparatus, such as the laser oscillator for generating a laser beam, and the optical path system for guiding the laser beam to the machining head.

In FIG. 9, the laser machining apparatus according to the third embodiment of the present invention is provided with, instead of the machining lens 3, a circular window 3A made of, for example, the same material as that for the machining lens 3, and a parabolic mirror or a toroidal mirror 18, and provided with, instead of the lens holder 4, a window holder 4A for holding the window 3A, and a folding mirror 20. Note that, the window 3A is provided immediately posterior to the parabolic mirror or the toroidal mirror 18, but may be provided immediately anterior thereto.

Next, description is made of operation of the laser machining apparatus according to the third embodiment with reference to the drawings.

In the laser machining, in some cases, the parabolic mirror or the toroidal mirror 18 is used instead of the machining lens 3 so as to condense the laser beam 2 onto the machining object 9. Also in those cases, the window 3A for transmitting the laser beam 2 through the machining head 1 may be provided. The window 3A generates the thermal lens as described above in the first embodiment.

As in the first embodiment, in FIG. 9, the laser beam 2 is emitted from the laser oscillator (not shown) and enters the curvature variable mirror 16 via the optical system, and then transmits through the window 3A via the folding mirror 20 to be guided to the machining head 1.

After entering the machining head 1, the laser beam 2 enters the parabolic mirror or the toroidal mirror 18 in the machining head 1, and is then condensed and radiated to the machining object 9.

Examples of the machining object 9 include metals such as a mild steel and a stainless steel. Examples of the laser used in this case include a $CO_2$ laser, a YAG laser, a fiber laser, and a semiconductor laser.

The window 3A absorbs a part of the laser beam 2 during transmission of the laser beam 2 therethrough, and heat absorbed simultaneously therewith flows toward the window holder 4A on the outer periphery of the window 3A. As a result, the thermal lens occurs.

As in the first embodiment described above, the temperature sensor 5 is configured as illustrated in FIG. 3. A temperature difference is generated between the hot junction 11 and the cold junction 12 of the thermocouple, and the calculation computer 7 calculates a thermal lens magnitude based on a potential difference of the thermocouple at this time. In accordance with the thermal lens magnitude obtained by the calculation computer 7, the control computer 8 calculates a curvature variation amount required for maintaining a stable beam diameter of the laser beam 2 with respect to the machining object 9, and sends a control signal to the mirror drive device for the curvature variable mirror 16.

The curvature variable mirror 16 has a function to vary a wavefront curvature of the laser beam 2 at the time of entry into the parabolic mirror or the toroidal mirror 18 so as to correct a focus variation caused by the thermal lens.

When those processes are performed in real time during machining, the laser beam 2 is radiated to the machining object 9 while being maintained to have a stable beam diameter. As a result, stable machining can be performed.

One or a plurality of thermocouples are provided on the window 3A, and the thermal lens magnitude is calculated based on the temperature difference between two points. During machining, a curvature of the curvature variable mirror is controlled for correcting this. In this way, machining can be stably performed irrespective of the thermal lens magnitude.

Fourth Embodiment.

Figure 11:
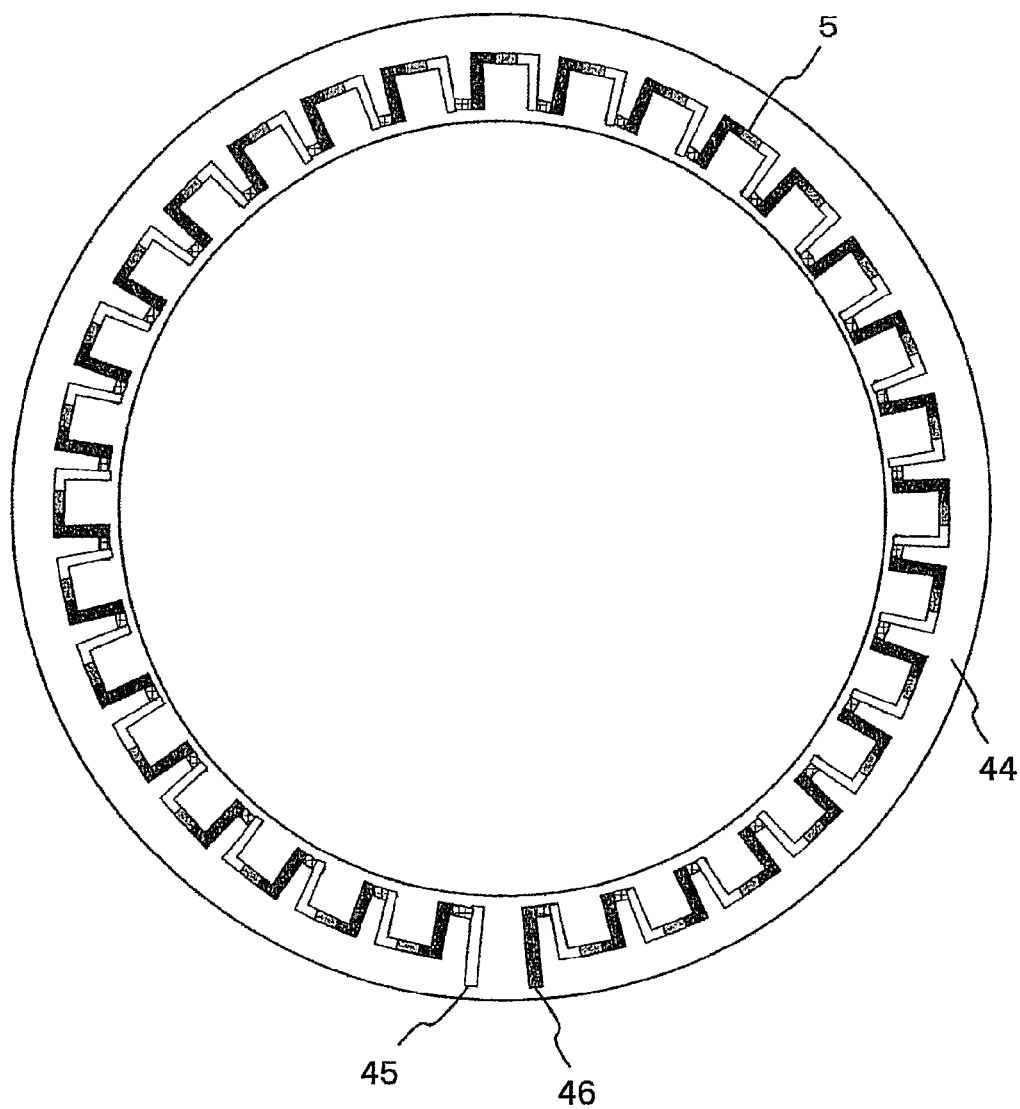
FIG. 11 is a plan view of a thermopile type temperature difference sensor of a laser machining apparatus according to a fourth embodiment of the present invention.
Figure 12:
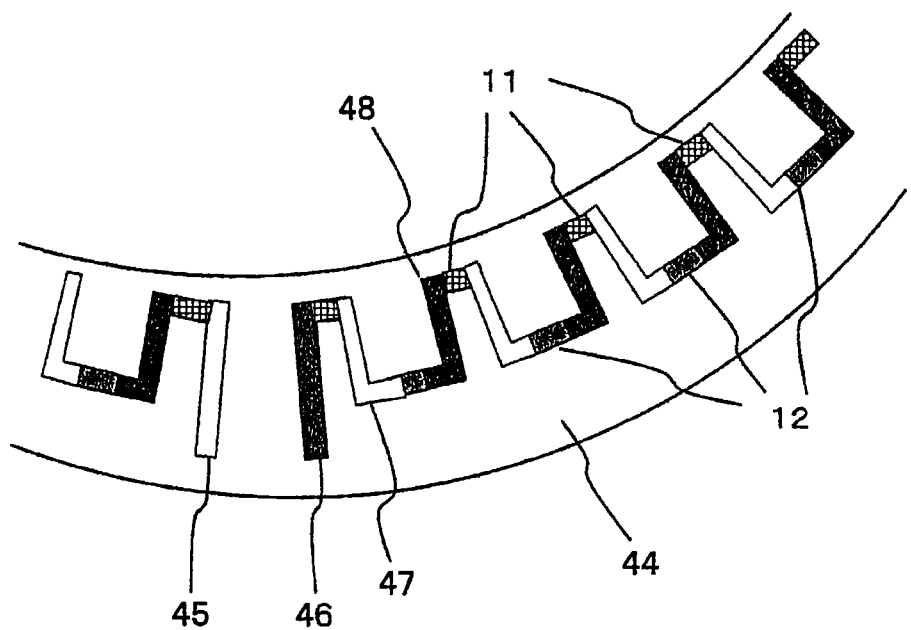
FIG. 12 is a partial enlarged view of the thermopile type temperature difference sensor of the laser machining apparatus according to the fourth embodiment of the present invention.

Description is made of a laser machining apparatus according to a fourth embodiment of the present invention with reference to FIGS. 11 and 12 as well as FIGS. 1 and 2.

The structure of the laser machining apparatus according to the fourth embodiment of the present invention is the same as that illustrated in FIG. 1 (in which the machining head 1 and the machining object 9 are illustrated in cross-section). Further, a peripheral structure of the machining lens 3 set in the machining head 1 of the laser machining apparatus according to the fourth embodiment of the present invention (cross-section near the machining lens 3 as a transparent member for transmitting the laser beam 2) is the same as that illustrated in FIG. 2.

Note that, in this case, the $CO_2$ laser is used as the laser, and a thermopile type temperature difference sensor is used as the temperature sensor 5.

The machining head 1 is configured to condense the laser beam 2 emitted from a laser light source (not shown) and then radiate the laser beam 2 to the machining object 9, and is arranged at a fixed clearance with respect to the machining object 9. As illustrated in FIG. 1, the machining head 1 includes the machining lens 3, the lens holder 4, the thermopile type temperature difference sensor 5 that is a contact type temperature difference sensor (described in detail below), and the lens drive device 6. The machining lens 3 is set on the optical path of the laser beam 2 so as to condense the laser beam 2. A circular plano-lens is used as the machining lens 3.

An insulating film provided with the thermopile type temperature difference sensor 5 is bonded to a surface of the machining lens 3 on an exit side of the laser beam 2, and the machining lens 3 is held by the lens holder 4. Further, the lens holder 4 is mounted to the lens drive device 6 for moving the machining lens 3 in the directions of the optical axis of the laser beam 2 (indicated by arrows).

Control means for correcting a focal position based on the temperature difference detected by the thermopile type temperature difference sensor 5 includes the lens drive device 6, the calculation computer 7 for calculating a lens moving amount based on results of the detection of the temperature difference, and the control computer 8 for driving the lens drive device 6 based on results of calculation of the lens moving amount.

The lens holder 4 has a circular cylindrical shape, and is provided with the annular coolant channel 10 in a form of surrounding the entire periphery of the laser beam 2. The annular light shields 13 are provided above and below the machining lens 3 at fixed clearances with respect to the machining lens 3 so as to prevent the thermopile type temperature difference sensor 5 from being exposed to the laser beam 2 reflected, for example, by a surface of the machining object, to thereby prevent errors in values of the temperature difference.

Note that, in the fourth embodiment, instead of a circular cylindrical shape, the lens holder 4 may have a polygonal cylindrical shape and the like.

Further, the thermopile type temperature difference sensor 5 that is a contact type temperature difference sensor is used for detecting the temperature difference between the two points on the surface of the machining lens 3, which are spaced apart from the center of the machining lens 3 by different distances. However, sensors of any other types may be employed as long as the temperature difference between the two points on the surface of the machining lens 3 can be detected.

For example, the temperature difference may be calculated as follows: with use of a thermocouple formed by joining two dissimilar metals, bonding two thermocouples to the two points on the surface of the machining lens, which are spaced apart from the center of the machining lens 3 by different distances; and measuring temperatures. Alternatively, the temperature difference may be calculated as follows: mounting two platinum resistance temperature detectors to the two points on the surface of the machining lens, which are spaced apart from the center of the machining lens 3 by different distances; and individually measuring temperatures. Still alternatively, the temperature difference may be calculated as follows: with use of one thermocouple and one platinum resistance temperature detector, mounting the one thermocouple and the one platinum resistance temperature detector respectively to the two points on the surface of the machining lens 3, which are spaced apart from the center of the machining lens 3 by different distances; and measuring temperatures.

In addition, the thermopile type temperature difference sensor 5 used in the fourth embodiment is excellent in detection accuracy, and is suitable to detection of the temperature difference on the surface of the machining lens 3.

Further, in the fourth embodiment, instead of the plano-convex lens, a biconvex lens may be used as the machining lens 3 as long as the laser beam 2 can be condensed onto the machining object 9.

Still further, the insulating film provided with the thermopile type temperature difference sensor 5, which is bonded to the surface of the machining lens 3 on the exit side of the laser beam 2, may be bonded to a surface of the machining lens 3 on the incident side of the laser beam 2 as long as a variation in temperature distribution of the machining lens 3, which is caused by the laser beam 2, can be detected.

In the following, detailed description is made of a structure of the thermopile type temperature difference sensor 5 with reference to FIGS. 11 and 12.

FIG. 11 is a plan view of the thermopile type temperature difference sensor 5 of the laser machining apparatus according to the fourth embodiment of the present invention, and FIG. 12 is a partial enlarged view of the thermopile type temperature difference sensor 5 of the laser machining apparatus according to the fourth embodiment of the present invention.

In FIG. 11, the thermopile type temperature difference sensor 5 of the laser machining apparatus of the present invention is viewed from the direction of the optical axis, in which the laser beam 2 exits.

In FIG. 11, on an annular polyimide film 44, a plurality of thermocouples each formed of two dissimilar metals are arrayed in an alternate series connection, to thereby form the thermopile type temperature difference sensor 5. Detection terminals 45 and 46 are formed at both ends of the series of thermocouples.

The polyimide film 44 forming the thermopile type temperature difference sensor 5 is bonded to the machining lens 3. The thermopile type temperature difference sensor 5 detects a temperature difference based on a potential difference between the detection terminals 45 and 46.

In FIG. 12 as a partial enlarged view, the thermocouples are each formed of L-shaped metal wires 47 and 48 formed of two dissimilar metals and connected electrically to each other with an intersecting portion therebetween on the polyimide film 44. Those thermocouples are arrayed to form double circles.

The laser beam 2 is radiated to a vicinity of the center of the machining lens 3. Thus a temperature of a central part of the machining lens 3 increases and a temperature of an outer peripheral part of the machining lens 3 relatively decreases. As a result, the thermocouples forming the circle on the center side of the machining lens 3 function as the hot junctions 11, and the thermocouples forming the circle on the outer side function as the cold junctions 12.

Copper and constantan (alloy having a composition of 55% copper and 45% Ni) are used as the two dissimilar metals, and patterned by photolithography after vapor deposition. In this way, the metal wires 47 and 48 are each formed to have a film thickness of 0.5 μm and a wire width of 0.5 mm. Parts at which the two dissimilar metals are overlapped and held in contact with each other serve as the thermocouples formed of thirty-two hot junctions 11 located on the center side of the machining lens 3 and having the relatively high temperature, and thirty-one cold junctions 12 located on an outer side of the machining lens 3 and having the relatively low temperature. The circle formed of the array of the hot junctions 11 has a radius of 20 mm, and the circle formed of the array of the cold junctions 12 has a radius of 25 mm. The hot junctions 11 and the cold junctions 12 are spaced 5 mm apart from each other in a radial direction of the circles. Further, the polyimide film 44 has a thickness of 50 μm.

The polyimide film 44 provided with the thermopile type temperature difference sensor 5 including the hot junctions 11 and the cold junctions 12 arrayed alternately in series is bonded to the machining lens 3, and the laser beam 2 is radiated to the machining lens 3. In this way, the potential difference between the detection terminals 45 and 46 at both the ends of the series array of the plurality of hot junctions 11 and the plurality of cold junctions 12 is detected. At this time, when the temperature of the hot junctions 11 and the temperature of the cold junctions 12 are different from each other, a potential difference caused by a thermoelectric effect is detected. In addition, unlike a temperature difference sensor including one hot junction 11 and one cold junction 12, when the plurality of hot junctions 11 and the plurality of cold junctions 12 are provided, the potential differences due to the thermoelectric effect are added up. Thus, even a slight temperature difference can be accurately detected based on a large potential difference.

Note that, in the fourth embodiment, instead of the copper and the constantan, other combinations of different metal materials may be used, such as chromel/alumel, iron/constantan, and platinum rhodium/platinum, which are generally used for thermocouples.

Further, when the width of the metal wires 47 and 48, which is not particularly limited, is set within a range of from 0.25 mm to 1 mm for convenience in wiring routing in the case where the hot junctions 11 and the cold junctions 12 are arrayed in large numbers, wiring design and the like are facilitated.

Further, the film thickness of the metal wires 47 and 48 made of different metals is set to 0.5 μm. However, the film thickness is not particularly limited thereto as long as the film can be formed through normal vapor deposition or the like and defects such as disconnection do not occur.

Further, in the fourth embodiment, the hot junctions 11 of the thermopile type temperature difference sensor 5, which are arranged on the center side of the machining lens 3, are located 20 mm apart from the center of the machining lens.

The beam diameter of, for example, a $CO_2$ laser, which enters the machining lens 3, normally ranges approximately from a radius of 10 mm to a radius of 15 mm. Thus, the hot junctions 11 of the thermocouple need to be mounted to the position separated from the center of the lens by the radius of 10 mm or more so as not to block the laser beam 2. Further, the cold junctions 12 need to be mounted on an outer side with respect to the hot junctions 11, and hence the radius of the machining lens 3 needs to fall within a range of at least from approximately 25 mm to 30 mm.

The mounting positions of the hot junctions 11 and the cold junctions 12 of the thermopile type temperature difference sensor 5 need to be made of the same material, free from a contact surface or the like therebetween, and located within the same individual. Within the same individual, the Fourier's law in the heat conduction theory can be applied, and hence the amount of heat applied to the machining lens 3 can be calculated based on the temperature differences detected by the thermopile type temperature sensor 5. When the contact surface is interposed between the hot junctions 11 and the cold junctions 12, a heat resistance value at the contact largely varies depending on a contact condition. Thus, a value of the amount of heat cannot be accurately calculated.

The numbers of the hot junctions 11 and the cold junctions 12, and the radial clearance between the hot junctions 11 and the cold junctions 12 on the machining lens 3 are not particularly limited, and may be set based on the temperature differences to be detected, and a sensitivity of a measuring instrument for detecting the potential difference.

In general, it is preferred that the radial clearance between the hot junctions 11 and the cold junctions 12 on the machining lens 3 be 10 mm or less in view of the diameter of the machining lens 3 to be used and arrangement for preventing the laser beam 2 from being blocked by the thermopile type temperature difference sensor 5. Further, it suffices that the number of the hot junctions 11 and the number of the cold junctions 12 be each one or more. Provision of larger numbers of the hot junctions 11 and the cold junctions 12 is more preferred because a detection sensitivity to the temperature differences can be enhanced.

Further, a positional relationship between the hot junctions 11 and the cold junctions 12 is not particularly limited. However, when the hot junction 11 and the cold junction 12 adjacent to each other are provided substantially in the same direction from the center of the machining lens 3, the temperature differences can be more accurately detected without an influence of the heat conductivity distribution in a plane of the machining lens 3. Specifically, when the hot junction 11 and the cold junction 12 adjacent to each other are formed within a range of a central angle of 60° from the center of the machining lens, the temperature difference can be more accurately detected.

Further, the thickness of the polyimide film 44 is not particularly limited, and there may be employed insulating films of any other types, which have insulating properties and a surface that can be provided with the thermopile type temperature difference sensor 5. For example, there may be employed a polyimide film 44 having a thickness of from approximately 10 μm to 125 μm. In addition, the material is not limited to polyimide, and there may be employed an electronic circuit board made of a thin resin and fiber, and having insulating properties and a thickness of from approximately 0.3 mm to 2 mm, or an FPC board formed of a polyimide film having a thickness of from approximately 0.1 mm to 0.3 mm.

The hot junctions 11 and the cold junctions 12 of the thermopile type temperature difference sensor 5 are set to the positions outside the irradiation range of the laser beam 2. Further, as illustrated in FIG. 2, when the light shields 13 are provided so as to prevent the scattered light of the laser beam 2, the reflected light from the machining object 9, and an infrared radiation beam from entering the temperature measurement points, the temperature differences can be more accurately detected. Thus, the provision of the light shields 13 is suitable. In this case, in order to eliminate an influence of radiant heat from the light shield 13 to the thermopile type temperature difference sensor 5, it is preferred that the light shields 13 be each spaced 1 mm or more apart from the machining lens 3.

Further, in the fourth embodiment, the polyimide film 44 provided with the thermopile type temperature difference sensor 5 is bonded onto the machining lens 3 with an adhesive. However, how to mount the polyimide film 44 onto the machining lens 3 is not limited thereto, and any other methods may be employed as long as the polyimide film 44 provided with the thermopile type temperature difference sensor 5 can be firmly fitted onto the machining lens 3.

For example, the polyimide film 44 can be mounted onto the machining lens 3 by being pressed by a heat insulating member having a low heat conductivity, such as a fluorine resin. Specifically, the polyimide film 44 provided with the thermopile type temperature difference sensor 5 may be held down onto the machining lens 3 by the heat insulating member machined into an annular shape, by utilizing a force of sandwiching and fixing the peripheral part of the machining lens 3 with the lens holder 4 having the heat insulating member mounted thereon.

When the heat absorbed into the machining lens 3 by the entry of the laser beam 2 into the machining lens 3 flows to the other parts before passing by the hot junctions 11 and the cold junctions 12, the detected temperature differences may not reflect a state of the thermal lens of the machining lens 3. As a countermeasure, it is required that nothing other than the hot junctions 11 of the thermocouples is held in contact with the machining lens 3 between the center of the machining lens 3 and the cold junctions 12. This may be achieved by the following method. Only on the outer peripheral side with respect to the cold junctions 12 on the machining lens 3, the machining lens 3 is held on the optical path of the laser beam 2 by the lens holder 4, and the polyimide film 44 provided with the thermopile type temperature difference sensor 5 is bonded onto the machining lens 3 with an adhesive.

When the thermopile type temperature difference sensor 5 is fixed by being held down onto the machining lens 3 with the heat insulating member, there is a risk that the heat insulating member is held in contact with the surface of the machining lens 3 between the center of the machining lens 3 and the cold junctions 12. Meanwhile, in order to secure sufficiently stable machining properties, errors in values of the temperature differences need to be reduced to 5% or less. Thus, in order to secure the stable machining properties by reducing the errors in the detection of the temperature differences to 5% or less even when the heat insulating member is held in contact with the surface of the machining lens 3 between the center of the machining lens 3 and the cold junctions 12, it is necessary to set a contact area of the outer peripheral part of the machining lens 3, which is located on the outer side with respect to the thermopile type temperature difference sensor 5, and the lens holder 4, and a contact area of the heat insulating member to be equal to each other. In addition, it is also necessary to set a heat conductivity of the heat insulating member for holding down the thermopile type temperature difference sensor 5 to 5% or less of the heat conductivity of 18 W/(m·K) of zinc selenide (ZnSe) as a general material for the machining lens 3, in other words, to 0.9 W/(m·K) or less.

When the thermocouples are formed into a thin film form by using a film forming method such as vapor deposition for the wires of the two dissimilar metals, the thermocouples can be more easily formed and coupled to each other at high density than in a case of coupling the plurality of thermocouples to each other in series with normal thermocouple wires. Thus, the thermopile type temperature difference sensor 5 having high sensitivity can be obtained.

Next, referring back to FIGS. 1, 6, and 7, description is made of a method of controlling the focal position in the fourth embodiment of the present invention.

FIG. 6 shows dependence of a temperature of the machining lens of the laser machining apparatus according to the fourth embodiment of the present invention on distance from the center of the machining lens 3. Further, FIG. 7 shows laser irradiation time dependence of the temperature difference detected by using the thermopile type temperature difference sensor 5 of the laser machining apparatus according to the fourth embodiment of the present invention.

As illustrated in FIG. 1, the laser beam 2 emitted from the laser light source (not shown) enters the machining lens 3, and is then condensed and radiated to the machining object 9. The temperature of the central part of the machining lens 3 increases as a result of absorption of a part of the laser beam 2, and the heat flows in a direction of the outer peripheral part thereof because the outer peripheral part is held by the lens holder 4 in contact therewith. Thus, as shown in FIG. 6, the radial temperature distributions from the center of the machining lens 3 are high at the central part and relatively low at the outer peripheral part. Further, when the irradiation time period increases from the irradiation time period 1 to the irradiation time period 3, the temperature differences between the central part and the outer peripheral part of the machining lens 3 increase. After that, although not shown in FIG. 6, certain temperature distribution profiles are obtained, and the temperature differences between the central part and the outer peripheral part of the machining lens 3 become constant.

As shown in FIG. 7, the temperature differences between the hot junctions 11 and the cold junctions 12, which are detected by using the thermopile type temperature difference sensor 5 on the machining lens 3, each tend to gradually increase along with the elapse of the irradiation time period of the laser beam 2 and to be saturated gradually to a certain value. Lens position correction amounts of the machining lens 3, which are required for offsetting variations of the focal length of the laser beam 2 corresponding to the temperature difference and maintaining the stable beam diameter of the laser beam 2 radiated to the machining object 9, are calculated through measurement and stored in the calculation computer 7 in advance.

Correspondingly to the temperature differences detected by the thermopile type temperature difference sensor 5 on the machining lens 3, the calculation computer 7 selects the lens position correction amount and outputs the lens position correction amount to the control computer 8. The control computer 8 drives the lens drive device 6 based on a value of the lend position correction amount so as to shift the position of the machining lens 3 along the directions of the optical axis of the laser beam 2 (directions of arrows in FIG. 1). In this way, the position of the machining lens 3 is corrected. As a result, the stable beam diameter can be maintained on the machining object, and hence stable laser machining can be performed.

As is understood from FIG. 7, the temperature difference on the machining lens 3 varies in accordance with the irradiation time period of the laser beam 2. Thus, when the control described above is performed at high speed in real time, the laser beam 2 can be radiated to the machining object 9 while being maintained to have a stable beam diameter. As a result, stable machining can be performed.

According to the fourth embodiment, the polyimide film 44 provided with the thermopile type temperature difference sensor 5 is used by being bonded to the machining lens 3, and hence the relative positions of the temperature difference detection position and the machining lens 3 do not vary. Thus, unlike Patent Literature 1, the temperature difference can be accurately detected always under a certain condition irrespective of the position of the machining lens 3. As a result, stable machining can be performed.

Further, according to the fourth embodiment, unlike Patent Literature 1, the far-infrared radiation thermometer is not used, and hence cost can be saved. In addition, stable machining can be performed without failures caused by influences of, for example, the scattered light of the laser beam 2, the reflected light from the machining object 9, and the radiation beam influenced by a temperature of the machining object 9.

Note that, in the fourth embodiment, the following control process is employed: selecting, based on the temperature difference detected on the machining lens 3, an optimum lens position correction amount from the lens position correction amounts stored in the calculation computer 7; and sending the value to the control computer 8. However, means for calculating the optimum lens position correction amount is not particularly limited, and any other methods may be employed as long as the lens position correction amount for offsetting the variation of the focal length of the laser beam 2 along with the variation of the temperature difference of the machining lens 3 can be calculated.

For example, the following control process can be employed: calculating, with the calculation computer 7, the thermal lens magnitude with the detected temperature difference and a physical constant such as heat conductivity; calculating the lens position correction amount for offsetting the variation of the focal length of the laser beam 2, which is caused by the influence of the thermal lens; and outputting the value thereof to the control computer 8.

Fifth Embodiment.

Figure 13:
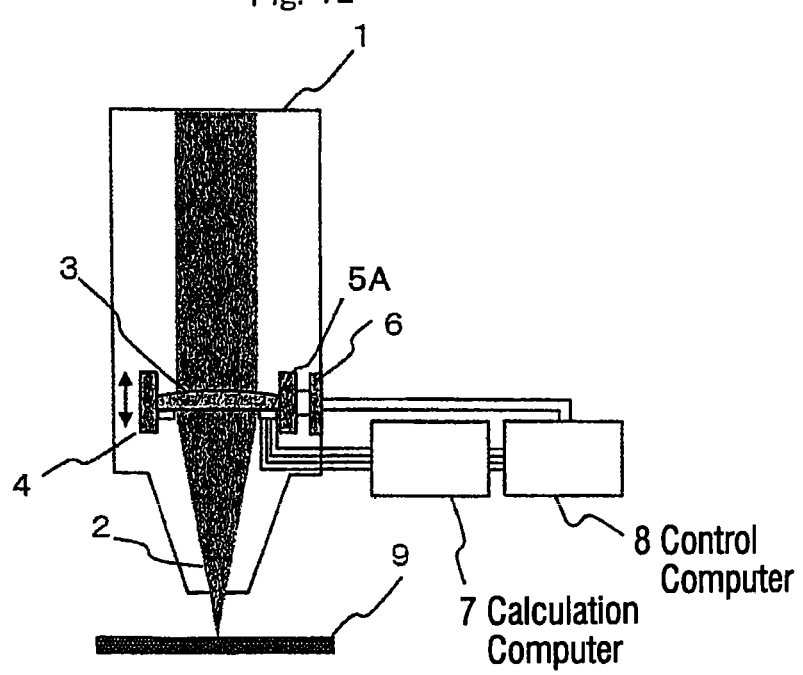
FIG. 13 is a partial sectional view of a structure of a laser machining apparatus according to a fifth embodiment of the present invention.

Description is made of a laser machining apparatus according to a fifth embodiment of the present invention with reference mainly to FIG. 13.

FIG. 13 is a partial sectional view of a structure of the laser machining apparatus according to the fifth embodiment of the present invention.

In the partial cross-section illustrated in FIG. 13, the machining head 1 for emitting the condensed laser beam is set at a fixed clearance with respect to the machining object 9. The structure of the laser machining apparatus is basically the same as the structure of the laser machining apparatus described above in the fourth embodiment except that, as described below, a thermopile type temperature difference sensor 5A formed on the machining lens 3 has a different structure, specifically, a larger number of output wires are connected from the thermopile type temperature difference sensor 5A to the calculation computer 7.

Figure 14:
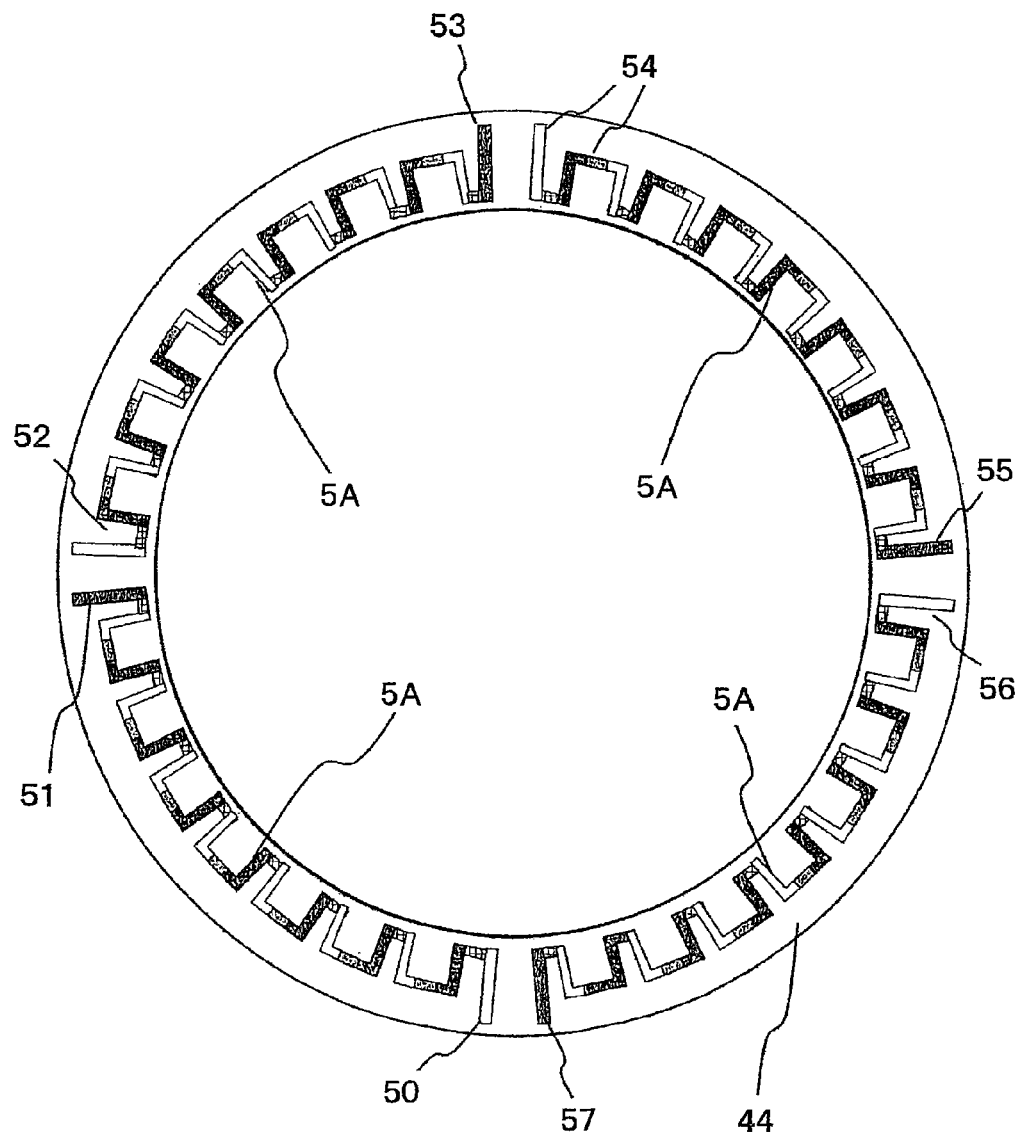
FIG. 14 is a plan view of a thermopile type temperature difference sensor of the laser machining apparatus according to the fifth embodiment of the present invention.

Next, with reference to FIG. 14, description is made of the structure of the thermopile type temperature difference sensor 5A.

FIG. 14 is a view of the thermopile type temperature difference sensor 5A of the laser machining apparatus according to the fifth embodiment of the present invention.

The thermopile type temperature difference sensor 5A is the same as the thermopile type temperature difference sensor 5 used in the fourth embodiment in that the plurality of thermocouples each formed of two dissimilar metals are arrayed in an alternate series connection on the annular polyimide film 44.

However, the thermopile type temperature difference sensor 5 described above (FIG. 11) is provided with the thermocouples formed continuously over the entire periphery, and detects the temperature difference based on detection of the potential difference between the detection terminals 45 and 46.

Meanwhile, as illustrated in FIG. 14, thermocouples of the thermopile type temperature difference sensor 5A used here are annularly arranged in four divided regions. Based on potential differences detected respectively between detection terminals 50 and 51, detection terminals 52 and 53, detection terminals 54 and 55, and detection terminals 56 and 57, which are provided at both ends of the respective series of thermocouples, temperature differences between the hot junctions 11 and the cold junctions 12 in each of the four regions are detected.

Next, description is made of a method of controlling the focal position in the laser machining apparatus 5 of the present invention, which is illustrated in FIGS. 13 and 14.

The method of controlling the focal position is basically the same as that in the fourth embodiment. The temperature of the machining lens 3 is changed by the laser beam 2, and the temperature differences between the hot junctions 11 and the cold junctions 12 are detected with the thermopile type temperature difference sensor 5A formed on the machining lens 3. Based on results of the detection of the temperature differences, the calculation computer 7 calculates the machining lens position correction value for offsetting the variation of the focal length of the laser beam 2 and outputs the correction value to the control computer 8. Then, the control computer 8 drives the lens drive device 6 so as to correct the machining lens position, to thereby stabilize the laser beam diameter on the machining object 9.

Here, the thermopile type temperature difference sensor 5A detects the temperature differences between the hot junctions 11 and the cold junctions 12 in each of the four regions, and outputs the results of the detection to the calculation computer 7. When the laser beam 2 is radiated to the center of the machining lens 3, the four values are equal to each other. Thus, based on those results of the detection, the machining lens position correction value can be calculated with the calculation computer.

Further, when the laser beam 2 is shifted from the center of the machining lens 3, the values of the four detected temperature differences are unequal to each other. In this case, based on the four detected temperature differences, a shifted amount of the laser beam 2 is calculated with the calculation computer 7, and alignment of the mirror on the optical path is performed with an electric motor or the like, or the position of the machining head 1 is automatically adjusted with a mechanism provided therefor. With this, the laser beam 2 is allowed to constantly enter the center of the machining lens 3. Alternatively, it is possible to inform an operator of the shift of the laser beam 2 from the center of the machining lens 3, by, for example, an alarm, and urge the operator to perform the adjustment.

Note that, the thermopile type temperature difference sensor 5A in the fifth embodiment is divided into the four regions. However, the number of divisions is not limited to four. When two or more regions are provided, the shift of the laser beam 2 can be calculated and hence two or more regions may be employed.

Further, the numbers of the hot junctions 11 and the cold junctions 12 in each of the divided regions are not particularly limited as well. This is because those numbers influence accuracy of detecting the temperature differences. Thus, as long as intended detection accuracy of the temperature differences can be secured, it suffices that at least one hot junction 11 and at least one cold junction 12 be provided.

Further, in the fifth embodiment, the polyimide film 44 provided with the thermopile type temperature difference sensor 5A is used by being bonded to the machining lens 3, and hence the relative positions of the temperature difference detection positions and the machining lens 3 do not vary. Thus, unlike Patent Literature 1, the temperature difference can be accurately detected always under a certain condition irrespective of the position of the machining lens 3. As a result, stable machining can be performed.

Further, according to the fifth embodiment, unlike Patent Literature 1, the far-infrared radiation thermometer is not used, and hence cost can be saved. In addition, stable machining can be performed without failures caused by influences of, for example, the scattered light of the laser beam 2, the reflected light from the machining object 9, and the radiation beam influenced by a temperature of the machining object 9.

Sixth Embodiment.

Description is made of a laser machining apparatus according to a sixth embodiment of the present invention referring back to FIG. 8. A structure of the laser machining apparatus according to the sixth embodiment of the present invention is the same as that illustrated in FIG. 8 (partial cross-section).

The structure of the machining head 1 is basically the same as that of the laser machining apparatus described in the fourth embodiment except that the lens drive device 6 illustrated in FIG. 1 is omitted, and the laser beam 2 from the laser light source (not shown) enters the machining head 1 via the curvature variable mirror 16 provided with a curvature adjustment device connected to the control computer 8.

As indicated by the arrows in FIG. 8, the curvature variable mirror 16 is capable of changing the curvature by changing a mirror surface between the solid line and the broken line. The control computer 8 is configured to drive the curvature adjustment device for the curvature variable mirror 16 so as to adjust the curvature of the curvature variable mirror 16.

Next, description is made of a method of controlling the focal position according to the sixth embodiment of the present invention.

The temperature distribution of the machining lens 3 arranged on the optical path of the laser beam 2 is changed by the laser beam 2, and the temperature differences between the hot junctions 11 and the cold junctions 12 are detected by the thermopile type temperature difference sensor 5.

The curvature variable mirror 16, the calculation computer 7, and the control computer 8 function as the control means for correcting the focal position. First, the calculation computer 7 calculates, based on the values of the temperature differences detected by the thermopile type temperature difference sensor 5, the correction amount for the focal position of the machining lens 3, by which the variation of the focal length of the laser beam 2 is offset, and the curvature variation amount of the curvature variable mirror 16, which is required for the correction. Then, those amounts are output to the control computer 8. Based on the results, the control computer 8 drives the curvature adjustment device for the curvature variable mirror 16 so as to adjust the curvature of the curvature variable mirror.

In this way, the focal position of the laser beam 2 is changed to stabilize the beam diameter of the laser beam 2 on the machining object 9. As a result, stable machining can be performed.

Further, according to the sixth embodiment, unlike Patent Literature 1, the far-infrared radiation thermometer is not used, and hence cost can be saved. In addition, stable machining can be performed without failures caused by influences of, for example, the scattered light of the laser beam 2, the reflected light from the machining object 9, and the radiation beam influenced by a temperature of the machining object 9.

The thermopile type temperature difference sensor 5 used in the sixth embodiment is the same as that according to the fourth embodiment, which includes thermocouples formed continuously over the entire periphery. However, the thermopile type temperature difference sensor 5A according to the fifth embodiment, which is divided into a plurality of regions, may be used as well. Further, a type of the curvature variable mirror 16 is not particularly limited. For example, there may be employed Mirror AO090/70 (product name: manufactured by Kugler GmbH) which adjusts a mirror curvature with an air pressure.

Seventh Embodiment.

Description is made of a laser machining apparatus according to a seventh embodiment of the present invention referring back to FIG. 9. A structure of the laser machining apparatus according to the seventh embodiment of the present invention is the same as that illustrated in FIG. 9 (partial cross-section).

The laser beam 2 is emitted from the laser light source (not shown) to enter the curvature variable mirror 16 provided with the curvature adjustment device, and then radiated to the toroidal mirror 18 for condensation via the folding mirror 20. The laser beam 2 reflected by the toroidal mirror 18 is condensed and radiated to the machining object 9.

Meanwhile, during the laser machining, an assist gas for removing the machining object melted by the laser beam 2 is blown into the machining head. Thus, in order to prevent the assist gas from flowing into other parts of the laser machining apparatus, between the machining head 1 and a main body of the laser machining apparatus, the window 3A as a transparent member for transmitting the laser beam 2 is provided on the optical path of the laser beam 2.

Argon is used as the assist gas. Further, the window 3A is made of ZnSe which is the same material as that for the machining lens 3, and is held by the window holder 4A. The polyimide film 44 provided with the thermopile type temperature difference sensor 5 connected continuously over the entire periphery is bonded to a surface of the window 3A on the folding mirror 20 side.

Next, description is made of a method of controlling the focal position according to the seventh embodiment of the present invention.

The laser beam 2 enters the toroidal mirror 18 through the window 3A, and is then reflected and condensed to be radiated onto the machining object 9. The window 3A slightly absorbs the laser beam 2 and the temperature thereof increases, and the focal position varies by the thermal lens effect. As a result, the beam diameter on the machining object 9 varies.

In view of this, the thermopile type temperature difference sensor 5 is formed on the window 3A so as to detect a temperature difference between predetermined positions on the window 3A. The control means is formed of the curvature variable mirror 16 capable of changing the mirror surface between the solid line and the broken line as indicated by the arrows in FIG. 9 so as to adjust the curvature, the calculation computer 7, and the control computer 8. Based on results of the detection of the temperature difference, the calculation computer 7 calculates the curvature variation amount of the curvature variable mirror 16, which is required for offsetting the variation of the focal length of the laser beam 2, and the control computer 8 adjusts the curvature variable mirror 16.

In this way, the focal position of the laser beam 2 is changed to stabilize the beam diameter on the machining object 9. As a result, stable machining can be performed.

Further, according to the seventh embodiment, unlike Patent Literature 1, the far-infrared radiation thermometer is not used, and hence cost can be saved. In addition, stable machining can be performed without failures caused by influences of, for example, the scattered light of the laser beam 2, the reflected light from the machining object 9, and the radiation beam influenced by a temperature of the machining object 9.

Note that, the window 3A is used between the toroidal mirror 18 and the folding mirror 20, but may be provided between the toroidal mirror 18 and the machining object 9, or between the folding mirror 20 and the curvature variable mirror 16.

Further, the polyimide film 44 provided with the thermopile type temperature difference sensor 5 is used by being bonded to the surface of the window 3A on the folding mirror 20 side, but may be used by being bonded to an opposite side of the folding mirror 20 as long as the temperature difference in the plane of the window 3A can be accurately detected.

Still further, the toroidal mirror 18 is not particularly limited as long as the laser beam 2 can be condensed onto the machining object 9, and may include a toroidal mirror and a parabolic mirror. Yet further, the assist gas is not particularly limited, and it is preferred to use general inert gases other than argon used in the seventh embodiment.

In addition, the thermopile type temperature difference sensor 5 used in the seventh embodiment is the same as that according to the fourth embodiment, which includes thermocouples formed continuously over the entire periphery. However, the thermopile type temperature difference sensor 5A according to the fifth embodiment, which is divided into a plurality of regions, may be used as well.

Eighth Embodiment.

Figure 15:
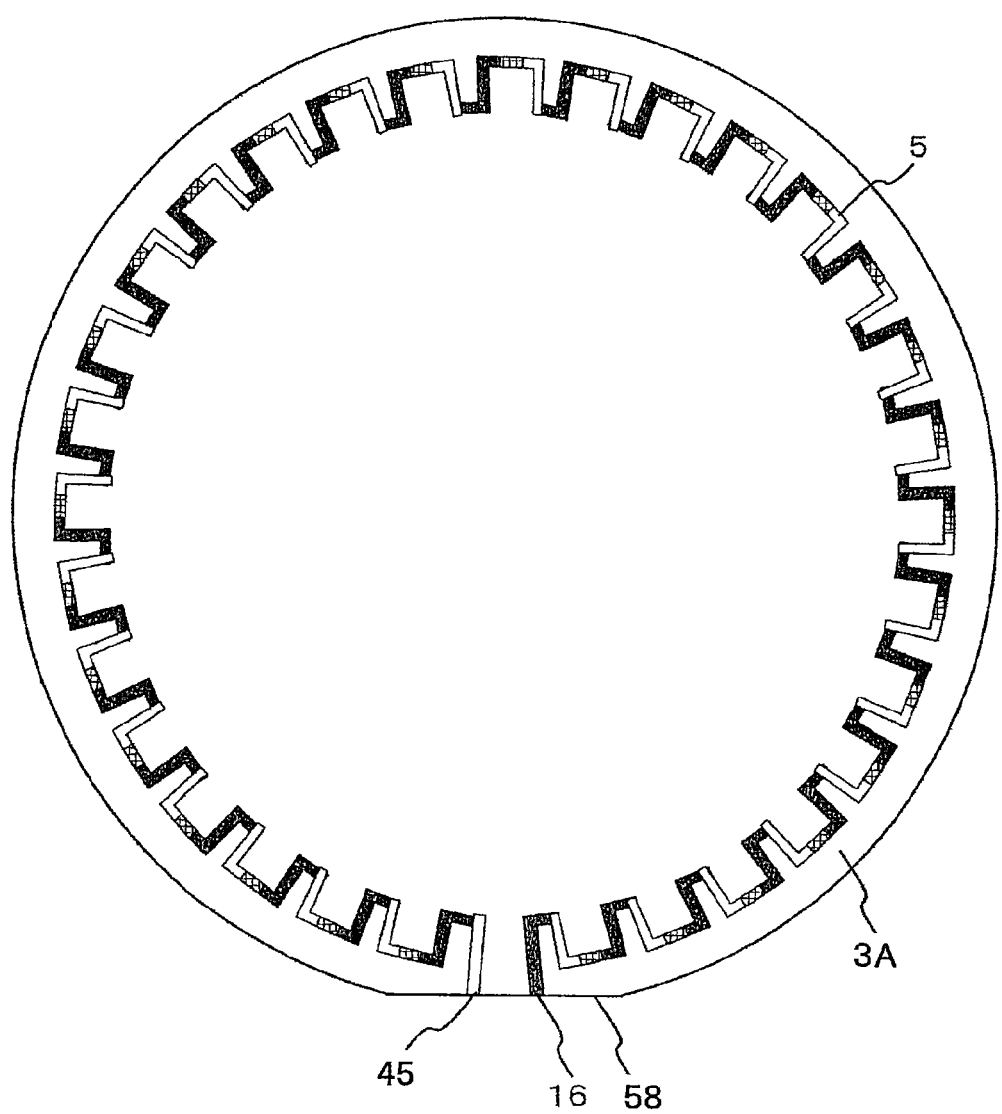
FIG. 15 is a plan view of a window of a laser machining apparatus according to an eighth embodiment of the present invention.

Description is made of a laser machining apparatus according to an eighth embodiment of the present invention with reference to FIG. 15.

FIG. 15 is a plan view of a window 3A of the laser machining apparatus according to the eighth embodiment of the present invention.

The structure of the laser machining apparatus and the method of controlling the focal position are basically the same as those illustrated in FIG. 9 in the seventh embodiment described above except that, as illustrated in FIG. 15, the thermopile type temperature difference sensor 5 is formed directly on the surface of the window 3A as the transparent member that is set on the optical path of the laser beam 2 and transmits the laser beam 2. The thermopile type temperature difference sensor 5 is formed directly on the window 3A by, for example, a vapor deposition method, and has a structure including thermocouples connected continuously over the entire periphery.

The window 3A is provided with a cutout 58 for clarifying positions of terminals for detecting the potential difference, and does not have a circular outer shape but an asymmetrical outer shape. With this, a setting direction of the window 3A can be defined, and hence assembly, repair, and the like of the laser machining apparatus are facilitated.

As described above, when the thermocouples are formed directly on the window 3A, temperature detection can be performed with higher accuracy because the window 3A and the temperature difference sensor 5 are held in stable contact with each other.

Further, according to the eighth embodiment, unlike Patent Literature 1, the far-infrared radiation thermometer is not used, and hence cost can be saved. In addition, stable machining can be performed without failures caused by influences of, for example, the scattered light of the laser beam 2, the reflected light from the machining object 9, and the radiation beam influenced by a temperature of the machining object 9.

Note that, in the eighth embodiment, the thermopile type temperature difference sensor 5 is formed directly on the window 3A described in the seventh embodiment, but the same advantages can be obtained also when the thermopile type temperature difference sensor 5 is formed directly on the machining lens 3 in the fourth, fifth, and sixth embodiments.

Further, the thermopile type temperature difference sensor 5 is the same as that according to the fourth embodiment, which includes thermocouples formed continuously over the entire periphery. However, the thermopile type temperature difference sensor 5A according to the fifth embodiment, which is divided into a plurality of regions, may be used as well.

Still further, in each of the first to eighth embodiments described above, examples of the machining object 9 include metals such as a mild steel and a stainless steel, carbon fiber, and a resin material.

Yet further, in each of the first to eighth embodiments described above, separate computers are used as the calculation computer 7 and the control computer 8. However, a single computer integrally having the functions of those computers may be used as a calculation control computer.

In addition, the $CO_2$ laser is used as the laser light source, but a type of the laser is not particularly limited. A YAG laser, a fiber laser, and a semiconductor laser may be used.

In the present invention, the embodiments may be freely combined with each other, or appropriately changed or omitted without departing from the scope of the present invention.

REFERENCE SIGNS LIST

1 machining head, 2 laser beam, 3 machining lens, 3A window, 4 lens holder, 4A window holder, 5, 5A temperature sensor (thermopile type temperature difference sensor), 6 lens drive device, 7 calculation computer, 8 control computer, 9 machining object, 10 coolant channel, 11 hot junction, 12 cold junction, 13 shield, 16 mirror drive device, 16 curvature variable mirror, 18 parabolic mirror, 18 toroidal mirror, 20 folding mirror, 44 polyimide film, 45, 46 detection terminal, 47, 48 metal wire, 58 cutout.

The invention claimed is:

1. A laser machining apparatus, comprising:
   a laser light source;
   a transparent member that is set on an optical path of a laser beam emitted from the laser light source and transmits the laser beam;
   a contact temperature difference sensor, that are set on a surface of the transparent member outside an irradiation range of the laser beam, for detecting a temperature difference between a surface of the transparent member, which is spaced apart from a center of the transparent member by a first distance, and another surface of the transparent member, which is spaced apart from the center of the transparent member by a second distance that is larger than the first distance; and control means for correcting a focal position based on the temperature difference detected by the contact temperature difference sensor so as to stabilize a beam diameter of the laser beam condensed onto a machining object.

2. A laser machining apparatus according to claim 1, wherein the transparent member comprises a machining lens for condensing the laser beam, and wherein the control means adjusts a clearance between the machining lens and the machining object based on the temperature difference detected by the temperature difference sensor so as to correct the focal position of the laser beam exiting from the machining lens.

3. A laser machining apparatus according to claim 2, wherein the control means adjusts the clearance between the machining lens and the machining object correspondingly to the temperature difference so as to offset a variation in focal length of the laser beam, which is caused by a thermal lens effect of the machining lens, to thereby correct the focal position of the laser beam.

4. A laser machining apparatus according to claim 1, wherein the transparent member comprises a machining lens, wherein the laser machining apparatus further comprises a curvature variable mirror for guiding the laser beam to the machining lens, and wherein the control means adjusts a curvature of the curvature variable mirror based on the temperature difference detected by the temperature difference sensor so as to correct the focal position of the laser beam exiting from the machining lens.

5. A laser machining apparatus according to claim 4, wherein the control means adjusts the curvature of the curvature variable mirror correspondingly to the temperature difference so as to offset a variation in focal length of the laser beam, which is caused by a thermal lens effect of the machining lens, to thereby correct the focal position of the laser beam.

6. A laser machining apparatus according to claim 1, wherein the transparent member comprises a window, wherein the laser machining apparatus further comprises:
a condenser mirror for condensing the laser beam, and
a curvature variable mirror for guiding the laser beam to the condenser mirror, and wherein the control means adjusts a curvature of the curvature variable mirror based on the temperature difference detected by the temperature difference sensor so as to correct the focal position of the laser beam reflected by the condenser mirror.

7. A laser machining apparatus according to claim 6, wherein the control means adjusts the curvature of the curvature variable mirror correspondingly to the temperature difference so as to offset a variation in focal length of the laser beam, which is caused by a thermal lens effect of the window, to thereby correct the focal position of the laser beam.

8. A laser machining apparatus according to claim 1, wherein the contact temperature difference sensor comprises:
a thermocouple formed at the first distance; and
a thermocouple formed at the second distance.

9. A laser machining apparatus according to claim 8, wherein the thermocouple formed at the first distance comprises one or more thermocouples comprising hot junctions, wherein the thermocouple formed at the second distance comprises one or more thermocouples comprising cold junctions, and wherein the contact temperature difference sensor comprises a thermopile temperature difference sensor comprising:
the one or more thermocouples comprising the hot junctions; and
the one or more thermocouples comprising the cold junctions,
the hot junctions and the cold junctions being arrayed in an alternate connection, the thermopile temperature difference sensor being configured to detect temperature differences between the hot junctions and the cold junctions.

10. A laser machining apparatus according to claim 9, wherein the thermopile temperature difference sensor is formed directly on a surface of the transparent member.

11. A laser machining apparatus according to claim 9, wherein the thermopile temperature difference sensor is formed on an insulating film and mounted to a surface of the transparent member through intermediation of the insulating film.

12. A laser machining apparatus according to claim 9, wherein a pair of adjacent ones of the hot junctions and the cold junctions of the thermopile temperature difference sensor is formed in substantially the same direction from the center of the transparent member.

13. A laser machining apparatus according to claim 9, wherein the thermopile temperature difference sensor is divided into a plurality of regions.

14. A laser machining apparatus according to claim 9, wherein a position of the hot junction of the thermopile temperature difference sensor is formed so as to be spaced 10 mm or more apart from the center of the transparent member.

15. A laser machining apparatus according to claim 9, wherein, only on an outer peripheral side with respect to the cold junctions of the thermopile temperature difference sensor, the transparent member is held on the optical path of the laser beam by a holder.

16. A laser machining apparatus according to claim 9, further comprising a heat insulating member that has a heat conductivity of 0.9 W/(m·K) or less and is held in contact with the transparent member between the center of the transparent member and the cold junctions.

* * * * *